United States Patent
Mäder et al.

(10) Patent No.: US 10,208,201 B2
(45) Date of Patent: Feb. 19, 2019

(54) PLASTICS COMPOSITION COMPRISING AT LEAST ONE METAL PIGMENT, METHOD FOR PRODUCTION AND USE THEREOF

(71) Applicant: Eckart GmbH, Hartenstein (DE)

(72) Inventors: Dietmar Mäder, Ruckersdorf (DE); Martin Schaal, Pommelsbrunn (DE); Wolfgang Trenz, Auerbach (DE)

(73) Assignee: ECKART GMBH, Hartenstein (DE)

( * ) Notice: Subject to any disclaimer, the term of this patent is extended or adjusted under 35 U.S.C. 154(b) by 0 days.

(21) Appl. No.: 15/029,057

(22) PCT Filed: Oct. 14, 2014

(86) PCT No.: PCT/EP2014/072048
§ 371 (c)(1),
(2) Date: Apr. 13, 2016

(87) PCT Pub. No.: WO2015/055674
PCT Pub. Date: Apr. 23, 2015

(65) Prior Publication Data
US 2016/0237275 A1 Aug. 18, 2016

(30) Foreign Application Priority Data
Oct. 14, 2013 (DE) .......... 10 2013 111 317

(51) Int. Cl.
| | | |
|---|---|---|
| C08L 69/00 | (2006.01) | |
| C08L 25/06 | (2006.01) | |
| C08L 27/06 | (2006.01) | |
| C08L 23/12 | (2006.01) | |
| C08L 23/06 | (2006.01) | |
| C08K 5/00 | (2006.01) | |
| C08K 7/00 | (2006.01) | |
| C08K 9/02 | (2006.01) | |
| C09C 1/62 | (2006.01) | |
| C08K 3/08 | (2006.01) | |

(52) U.S. Cl.
CPC .............. C08L 69/00 (2013.01); C08K 5/005 (2013.01); C08K 7/00 (2013.01); C08K 9/02 (2013.01); C08L 23/06 (2013.01); C08L 23/12 (2013.01); C08L 25/06 (2013.01); C08L 27/06 (2013.01); C09C 1/62 (2013.01); *C01P 2006/60* (2013.01); *C08K 2003/0812* (2013.01); *C08K 2003/0856* (2013.01)

(58) Field of Classification Search
CPC .......... C08L 69/00; C08L 25/06; C08L 27/06; C08L 23/12; C08L 23/06
USPC ........................................... 524/291
See application file for complete search history.

(56) References Cited

U.S. PATENT DOCUMENTS

| | | | |
|---|---|---|---|
| 4,090,773 A | 5/1978 | Bauer et al. | |
| 4,093,592 A * | 6/1978 | Mayer .................... | C09K 15/08 524/285 |
| 6,036,763 A | 3/2000 | Edwards et al. | |
| 6,174,360 B1 | 1/2001 | Sliwinski et al. | |
| 7,619,031 B2 | 11/2009 | Kanayama et al. | |
| 8,206,629 B2 | 6/2012 | Shiao et al. | |
| 2002/0134282 A1 | 9/2002 | Ostertag et al. | |
| 2002/0169244 A1 | 11/2002 | Ostertag et al. | |
| 2002/0188051 A1 | 12/2002 | Hugo | |
| 2003/0150359 A1 | 8/2003 | Lassmann | |
| 2003/0228478 A1 * | 12/2003 | Takahashi ................ | C08K 5/13 428/480 |
| 2003/0236352 A1 * | 12/2003 | Winowiecki ........... | B82Y 30/00 525/191 |
| 2004/0018360 A1 | 1/2004 | Hugo | |
| 2004/0068046 A1 | 4/2004 | Hugo | |
| 2004/0229977 A1 | 11/2004 | Watson et al. | |
| 2005/0123764 A1 | 6/2005 | Hoffmann et al. | |
| 2006/0099420 A1 * | 5/2006 | Bujard .................. | C09C 1/0015 428/403 |
| 2007/0199478 A1 | 8/2007 | Schlegl et al. | |
| 2008/0138609 A1 | 6/2008 | Walker | |
| 2009/0130430 A1 | 5/2009 | Hugo | |
| 2009/0137771 A1 * | 5/2009 | Moriyama ........... | A61K 6/0023 528/380 |
| 2009/0214827 A1 | 8/2009 | Howie, Jr. | |
| 2010/0075142 A1 | 3/2010 | Scharnke et al. | |
| 2010/0242793 A1 | 9/2010 | Greb et al. | |
| 2011/0048276 A1 | 3/2011 | Schlegl et al. | |
| 2011/0151163 A1 | 6/2011 | Bloom et al. | |
| 2011/0251303 A1 | 10/2011 | Rathschlag et al. | |
| 2012/0283336 A1 * | 11/2012 | Grigorenko ........... | B22F 1/0022 514/769 |
| 2014/0335329 A1 | 11/2014 | Abayasinghe et al. | |

FOREIGN PATENT DOCUMENTS

| | | |
|---|---|---|
| CN | 20121072685 | 3/2012 |
| CN | 102627828 A | 8/2012 |
| DE | 2544245 | 4/1977 |
| DE | 19717878 A1 | 10/1998 |
| DE | 10010538 A1 | 9/2001 |
| DE | 10027295 A1 | 12/2001 |
| DE | 10027296 A1 | 8/2002 |
| DE | 102008064202 A1 | 6/2010 |
| DE | 102009046625 A1 | 5/2011 |
| EP | 3673980 A2 | 9/1995 |
| EP | 1251152 A1 | 10/2002 |
| EP | 1251153 A1 | 10/2002 |
| EP | 1256437 A1 | 11/2002 |
| EP | 1541636 A1 | 6/2005 |
| EP | 1916352 A2 | 4/2008 |
| EP | 2157138 A1 | 2/2010 |
| WO | 0024833 A1 | 5/2000 |
| WO | 0212405 A2 | 2/2002 |
| WO | 02057374 A1 | 7/2002 |

(Continued)

*Primary Examiner* — Deve E Valdez
(74) *Attorney, Agent, or Firm* — The Webb Law Firm

(57) ABSTRACT

The present invention relates to a plastics composition which comprises at least one platelet-shaped metal pigment from a range of from 0.01 to 25 wt.-%, at least one light stabilizer from a range of from 0.01 to 10 wt.-% and at least one antioxidant from a range of from 0.01 to 2 wt.-%, in each case relative to the proportion by weight of the plastics composition.

22 Claims, No Drawings

(56) References Cited

FOREIGN PATENT DOCUMENTS

| | | |
|---|---|---|
| WO | 2004087816 A2 | 10/2004 |
| WO | 2006058782 A1 | 6/2006 |
| WO | 2008155038 A2 | 12/2008 |
| WO | 2009144005 A1 | 12/2009 |
| WO | 2012075369 A1 | 6/2012 |

* cited by examiner

PLASTICS COMPOSITION COMPRISING AT LEAST ONE METAL PIGMENT, METHOD FOR PRODUCTION AND USE THEREOF

CROSS-REFERENCE TO RELATED APPLICATIONS

This application is the United States national phase of PCT International Application No. PCT/EP2014/072048 filed Oct. 14, 2014, and claims priority to German Patent Application No. 10 2013 111 317.6, filed Oct. 14, 2013, the disclosures of each of which are hereby incorporated by reference in their entireties.

BACKGROUND OF THE INVENTION

Field of the Invention

The present invention relates to a plastics composition pigmented with platelet-shaped metal pigments, a method for production of same and use thereof.

Surfaces which are dyed or coated dark for esthetic or technical reasons and are exposed to sunlight have the usually undesired property of heating up to a greater or lesser extent depending on the color depth. The solar heating of dark surfaces is perceived as extremely unpleasant for example in vehicle interiors. Dark surfaces heat up to a greater or lesser extent as a function of solar absorption and dissipate this absorbed heat as heat radiation and via air convection for example into the interior of a vehicle. Furthermore, the relatively high heat storage capacity of these dark surfaces contributes to the heating for example of vehicle interiors. The higher the thermal capacity and thermal conduction into the material, the more solar energy that can be stored in the materials. The heat dissipation then takes place slowly via heat radiation and convectively via the air.

Description of Related Art

WO 02/12405 A2 relates to a flat element having a dark surface and exhibiting a reduced solar absorption, wherein the reflectance of the substrate of the flat element is less than 50% in the visible light range of from 380 to 720 nm and more than 60% in the near-infrared range of from 720 to 1500 nm. The coating of the substrate consists of a binder which has a transparency greater than 70% in the spectral range of from 380 to 1500 nm and first pigments which give the coating a reflectance of less than 50% in the visible light range and give the coating a transparency of more than 50% in the near-infrared spectral range and/or second pigments which give the coating a reflectance of less than 50% in the visible light range and give the coating a reflectance of more than 40% in the near-infrared spectral range. The first pigments are organic pigments which are used in a quantity of from 0.2 to 20 wt.-%, in relation to the total formulation, to produce the coating. The second pigments are inorganic pigments, such as e.g. coated, platelet-shaped mica pigments which are used in a quantity of from 4 to 50 wt.-%, in relation to the total formulation, to produce the coating. The flat element has a high reflectance in the near-infrared range in order, despite the dark dyeing in the visible range, to reduce the heating under sunlight, which is desired in applications which are not to heat up under sunlight even though they have dark surfaces. No metal effect pigments are used for the pigmentation.

A dark, flat element with low solar absorption, i.e. a combination of a carrier material with components embedded therein, is also claimed in WO 2006/058782 A1. The element has an average reflectance of less than 50% in the visible light wavelength range of from 400 to 700 nm; the average reflectance in the near-infrared wavelength range of from 700 to 1000 nm is more than 50%. The carrier material can be a plastic. The embedded components include, among other things, pigments, but not metal pigments, and dyes.

WO 00/24833 A1 discloses a coating with spectral selectivity, in particular for deposit surfaces in motor vehicles, comprising a) a binder with a transmittance of 60% or more in the near-infrared wavelength range of from 0.7 to 2.5 µm, and with a transmittance of 40% or more in the thermal infrared wavelength range, b) first pigments which absorb 40% or more of the visible light in the wavelength range of from 0.35 to 0.7 µm, have a backscatter of 40% or more in the near-infrared of from 0.7 to 2.5 µm and have an absorption of 60% or less in the thermal infrared wavelength range, c) second pigments which have a backscatter and/or reflectance of 40% or more in the thermal infrared wavelength range. The binder can here be selected from thermoplastic materials such as polyolefins and polyvinyl compounds. The first pigments can be inorganic or organic pigments. The second pigments include, among other things, platelet-shaped metals or metal alloys, such as iron for example.

A coating with low solar absorption is disclosed in WO 02/057374 A1. This coating comprises a) a binder and/or a binder combination, b) first pigments which have a transparency greater than 70% in the wavelength range of from 300 to 2500 nm, the particle size of which is chosen such that they have a high backscatter greater than 70% in the near-infrared wavelength range of from 700 to 1500 nm and which have an absorption greater than 40% in the thermal infrared range of from 5 to 50 µm, c) second pigments which absorb spectral-selectively in the visible light wavelength range of from 400 to 700 nm and/or more than 50% in the entire visible light wavelength range, which have a transparency greater than 50% in the near-infrared wavelength range of from 70 to 1500 nm and which have an absorption greater than 40% in the thermal infrared range, and/or d) third pigments which absorb spectral-selectively in the visible light spectral range and/or absorb more than 50% in the entire visible light wavelength range and which are reflective with a reflectance greater than 50% in the near-infrared spectral range and which have an absorption greater than 40% in the thermal infrared range, e) fillers. The first and third pigments can be inorganic pigments, the second pigments are organic pigments, metal pigments are not mentioned.

DE 25 44 245 A1 mentions the possibility of incorporating IR-reflective pigments into molding materials, wherein the pigments align largely surface parallel during processing. According to EP 1 256 437 A1, however, the alignment of the particles is not as good in a plastic body made of e.g. extruded molding material with IR-reflective pigments distributed uniformly therein as in the case of a coextruded or varnished separate layer. According to EP 1 256 437 A1 this applies in particular to plastic bodies with a comparatively complicated geometry, which deviate from the simple plate shape and in the production of which different melt flow directions and shear forces occur during the extrusion, which force the pigment particles into different alignments and thus also expose them to higher mechanical stresses overall.

EP 1 256 437 A1 relates to a method for producing a light-permeable, IR-reflective plastic body, consisting entirely or at least partially of an impact-resistant thermoplastic, containing 0.01 to 5 wt.-% reflective particles made of platelet-shaped carrier pigments coated with a metal oxide.

DE 100 10 538 A1 describes a dirt-repellent coating material with spectral-selective properties which comprises, among other things, a binder with good UV resistance and first, platelet-shaped particles. The latter reflect in the thermal infrared wavelength range of from 5 to 100 µm. The first platelet-shaped particles can be for example metals and/or metal alloys of aluminum, aluminum bronze, iron, copper, zinc or tin. The binders can be selected e.g. from thermoplastic materials such as polyolefins or polyvinyl compounds.

EP 0 673 980 A2 relates to colored iron or iron alloy pigments which are obtained at an elevated temperature in an oxygen-containing atmosphere. These pigments can be used for example in plastics in order to imitate a granite effect.

EP 1 541 636 A1 describes a thermoplastic plastics composition which comprises 0.1 to 15 parts by mass of inorganic pigment with infrared-reflective properties. The inorganic pigment can contain at least one of the elements Fe, Cr, Mn, Cu, Co or Ni and can be selected for example from the oxides FeO, FeO(OH), $Fe_2O_3$, CrO, $Cr_2O_3$, MnO or CuO.

EP 1 916 352 A2 discloses a roofing product which comprises two coextruded polymer layers, wherein the first layer reflects in the near-infrared and the second layer is permeable in that range. Both layers can be pigmented, wherein metal pigments or metal platelets encapsulated in silicon dioxide can be used as solar-reflective pigments.

WO 2012/075369 A1 discloses compositions which are used to form products with an increased reflectance in the near-infrared range. Metals or metal alloys of e.g. aluminum, cobalt, iron, manganese or zinc can be used as infrared-reflective pigments.

CN 102627828 A claims a plastics composition which contains 0.1 to 2.0 parts by weight metal pigment, 0.1 to 2.0 parts by weight infrared-reflective pigment, 0.1 to 2.0 parts by weight lubricant, 0.1 to 1.0 parts by weight antioxidant, 0.1 to 0.5 parts by weight toner. Aluminum or silver powder, among other things, can be used as metal pigment; iron, copper or zinc, for example, can be used as infrared-reflective pigment.

US 2008/0138609 A1 discloses a plastics composition which comprises less than 5 wt.-% infrared-reflective pigments. An inorganic color pigment, such as described e.g. in U.S. Pat. No. 6,036,763 A or U.S. Pat. No. 6,174,360 B1, is used as infrared-reflective pigment.

SUMMARY OF THE INVENTION

In some examples, there is provided a plastics composition, comprising at least one platelet-shaped metal pigment in a quantity from a range of from 0.01 to 25 wt.-%, at least one light stabilizer in a quantity of from 0.01 to 10 wt.-%, and at least one antioxidant in a quantity of from 0.01 to 2 wt.-%, wherein the at least one light stabilizer and the at least one antioxidant are in quantities relative to the total weight of the plastics composition.

In some examples, there is provided a method for producing the plastics composition described herein, wherein the method comprises: a) mixing the at least one metal pigment, the at least one light stabilizer and the at least one antioxidant with a plastics component, b) extruding the mixture from step a), and c) injection-molding the extrudate from step b) to form plates.

DETAILED DESCRIPTION

An object of the present invention is to provide a composition which itself does not heat up or only heats up slightly under irradiation by sunlight. The composition is furthermore to be characterized by its weathering resistance.

This object was achieved by the provision of a plastics composition which comprises at least one platelet-shaped metal pigment in a quantity from a range of from 0.01 to 25 wt.-%, at least one light stabilizer in a quantity from a range of from 0.01 to 10 wt.-% and at least one antioxidant in a quantity from a range of from 0.01 to 2 wt.-%, in each case relative to the proportion by weight of the plastics composition.

Preferred embodiments of the plastics composition according to the invention are given in dependent claims 2 to 7.

Furthermore, the object was achieved by the provision of a method for producing the plastics composition according to the invention.

A subject of the invention is furthermore the use of the plastics composition according to the invention as a film, plate or profile.

The object of the invention is furthermore achieved by the use of at least one platelet-shaped iron pigment coated with silicon oxides, silicon hydroxides and/or silicon oxide hydrates in a plastics composition according to one of claims 1 to 7.

The platelet-shaped metal pigment which is to be used in the plastics composition according to the invention, and which is optionally coated, can be selected from the group consisting of iron and/or iron alloy pigments, aluminum and/or aluminum alloy pigments, or mixtures thereof.

Optionally coated iron and/or iron alloy pigments are preferably used in the plastics composition according to the invention. Coated iron and/or iron alloy pigments are particularly preferably used in the plastics composition according to the invention.

By iron pigments is meant within the framework of this invention platelet-shaped pigments which have an iron content of ≥95 wt.-%, preferably ≥97 wt.-%, particularly preferably ≥99 wt.-% and quite particularly preferably ≥99.5 wt.-%, in each case relative to the total weight of the pigment. Among other things, carbon or oxygen can be present as further constituents.

The iron content of the pigments can be influenced for example by the production method and the starting materials. Platelet-shaped, optionally coated, iron pigments which have been produced according to EP 1 251 152 A1, EP 1 251 153 A1 or EP 2 157 138 A1 from reductively treated carbonyl iron powder are preferably used.

EP 1 251 152 A1 discloses platelet-shaped iron pigments produced from reductively treated carbonyl iron powder, which are used both in the decorative field, such as e.g. plastics dyeing, coatings, printing or cosmetics, and in the functional field, such as e.g. in the securities field.

EP 1 251 153 A1 describes platelet-shaped, metal oxide-coated soft iron pigments which are produced from reduced carbonyl iron powder by molding. In the decoration field, the pigments are used e.g. in varnish, in paints, plastics, in printing, in glass, ceramic and in cosmetics. In the functional sector, the special magnetic properties, those of the electrical conductivity, the ability to absorb radar waves, or the electromagnetic wave capacity, are utilized.

EP 2 157 138 A1 claims thin, platelet-shaped iron pigments which have an $h_{50}$ value from a range of from 10 to 55 nm and an $h_{90}$ value from a range of from 20 to 80 nm. Iron pigments with such a thickness distribution have a high gloss with, at the same time, a darkness or blackness. The iron pigments can be used e.g. in coatings, paints, varnishes, printing inks, power coatings, plastics, cosmetic formulations and in the securities and security printing field.

By iron alloy pigments is meant within the framework of this invention platelet-shaped pigments which have an iron content from a range of from ≥50 wt.-% to <95 wt.-%, preferably from a range of from ≥60 wt.-% to <95 wt.-%, particularly preferably from a range of from ≥70 wt.-% to <95 wt.-% and quite particularly preferably from a range of from ≥80 wt.-% to <95 wt.-%, in each case relative to the total weight of the pigment. Chromium, tungsten, molybdenum, vanadium, cobalt, nickel, niobium, silicon, manganese or mixtures thereof come into consideration here as alloy constituents.

The optionally present coating of the metal pigments comprises or consists of metal oxides, metal hydroxides and/or metal oxide hydrates of silicon, titanium and/or zirconium. Alternatively, the optionally present coating comprises or consists of polyacrylates, polyurethanes, polycarbonates, polyesters or mixtures thereof. The optionally present coating preferably comprises or consists of metal oxides, metal hydroxides and/or metal oxide hydrates of silicon.

In an embodiment, the metal core of the platelet-shaped metal pigments to be used in the plastics composition according to the invention has an average thickness from a range of from 14 to 500 nm, preferably from a range of from 21 to 340 nm and particularly preferably from a range of from 36 to 280 nm.

In particularly preferred embodiments, platelet-shaped aluminum and/or iron pigments coated with $SiO_2$ are used. Iron pigments coated with $SiO_2$ and having an average thickness of the platelet-shaped iron core from a range of from 20 to less than 100 nm, in particular from a range of from 25 to 60 nm are quite particularly preferred. Plastics formulations according to the invention pigmented with such thin iron pigments have a surprisingly dark intrinsic color. The inventors have not yet found a conclusive explanation for this. Iron is known to reflect less than aluminum in the visible wavelength range; nevertheless the startlingly dark intrinsic color is surprising. Even in plastics applications in which the platelet-shaped iron pigments are oriented very well plane-parallel to the plastic surface, a dark intrinsic color is perceived. This is all the more surprising as the platelet-shaped iron pigments oriented plane-parallel have a relatively high reflectance in the visible range at least at the glancing angle.

Because of the small thickness of the iron effect pigments, a relatively low concentration from a range of from 0.1 to 2.5 wt.-%, preferably from a range of from 0.15 to 2.3 wt.-% and particularly preferably from a range of from 0.18 to 2.1 wt.-%, in each case relative to the proportion by weight of the plastics composition, can be used.

If a dark plastics composition is to be provided, the plastics composition according to the invention preferably comprises, as metal pigment, exclusively iron pigments which are preferably coated with silicon oxides, silicon hydroxides and/or silicon oxide hydrates, and not aluminum pigments. It has surprisingly proved that in this embodiment the infrared reflectance of this plastics composition is high enough to prevent the undesired strong temperature increase in the event e.g. of solar irradiation. This is surprising in this respect because the infrared reflectance of iron is known to be much lower than that of aluminum. In addition, plastics compositions pigmented only with iron pigments are substantially darker than plastics compositions pigmented with aluminum pigments.

This dark intrinsic color combined with the excellent reflective properties of the plastic can be used advantageously in particular in molded parts such as for example in dark parts for automobile interiors, such as dashboards, door trims etc. as well as for external applications, such as e.g. plastic cladding, plastic window frames, plastic pipes or roof tiles made of plastic.

The combination of the dark intrinsic color and the very good reflective properties, which leads to a relatively small rise in the surface temperature under solar irradiation, is a highly sought-after profile of properties in terms of application technology here. Plastics compositions which comprise conventional black pigments combined with IR-reflective pigments have not yet satisfactorily achieved this profile of properties.

By "dark plastics composition" is meant within the meaning of this invention that large portions of the visible light are absorbed by the plastics composition according to the invention and thereby perceived as dark by the human eye. Here the lightness $L^*$ of the dark plastics composition, determined by diffuse color measurement using a CR 310 colorimeter from Konica Minolta, lies preferably at ≤60, particularly preferably at ≤50 and quite particularly preferably at ≤40. Although the plastics composition is definitely perceived as dark by the human eye, the measured lightness values are surprisingly high, which can be explained, however, by the reflectance of the metal pigments. The dark plastics composition is very opaque even at low pigmentation.

The average thickness of the platelet-shaped metal pigments is determined with reference to a hardened varnish film in which the pigments are aligned substantially plane-parallel to the substrate. For this, a cross section of the hardened varnish film is examined under a scanning electron microscope (SEM), wherein the thickness of 100 pigments is determined and statistically averaged, as described in WO2004087816A2, p. 24.

In a further embodiment the coating comprising or consisting of metal oxides, metal hydroxides and/or metal oxide hydrates can comprise at least one color pigment in a quantity of from 20 to 80 wt.-%, preferably in a quantity of from 30 to 70 wt.-% and particularly preferably in a quantity of from 40 to 65 wt.-%, in each case relative to the total weight of the metal pigment. The at least one color pigment can be present distributed in the coating or can be applied to the coating, preferably the color pigment is present distributed in the coating. The coating preferably comprises dark color pigments, preferably in the form of particles which have a low absorption in the near-infrared (NIR) wavelength range of from 0.8 to 2.5 μm. Brown and/or black color pigments which have an average primary particle size from a range of from 10 nm to 1000 nm, preferably from a range of from 20 nm to 800 nm and particularly preferably from a range of from 30 nm to 400 nm are particularly preferred. For example iron oxides, iron-manganese mixed oxides, chromium-iron black $Cr_2O_3(Fe)$, chromium-iron brown $(Fe,Cr)_2O_3$ and/or $(Zn,Fe)(Fe,Cr)_2O_4$, copper-chromium spinels of the $CuCr_2O_4$ type, organic color pigments from the group of perylenes or mixtures thereof can as color pigments. Such pigments can be produced according to WO 2008/155038 A2.

WO 2008/155038 A2 relates to a dark, IR-radiation reflecting pigment which a platelet-shaped, metallic, IR-radiation reflecting core. The low IR-radiation absorbing coating surrounding the core comprises dark color pigments in, on and/or under a matrix. Platelet-shaped pigments made of aluminum, copper, zinc, tin, titanium, iron, silver and/or alloys of these metals are preferably used as platelet-shaped core.

By aluminum pigments is meant within the framework of this invention platelet-shaped pigments which have an aluminum content of ≥97 wt.-%, preferably of ≥98 wt.-%, particularly preferably of ≥99 wt.-% and quite particularly preferably of ≥99.5 wt.-%, in each case relative to the total weight of the pigment. Among other things, metallic iron or oxygen can be present as further constituents.

By aluminum alloy pigments is meant within the framework of this invention platelet-shaped pigments which have an aluminum content of <97 wt.-%, preferably of from 65 to 95 wt.-%, particularly preferably of from 70 to 90 wt.-% and quite particularly preferably of from 75 to 85 wt.-%, in each case relative to the total weight of the aluminum alloy pigment. One or more metals other than aluminum, preferably iron, manganese, copper, vanadium, chromium, nickel, cobalt, silicon, magnesium, zinc or titanium, can be selected as alloy constituents.

The average particle size $D_{50}$ of the platelet-shaped metal pigments to be used in the plastics composition according to the invention preferably lies in a range of from 1 to 100 μm, further preferably in a range of from 3 to 69 μm, particularly preferably in a range of from 4 to 61 μm and quite particularly preferably in a range of from 5 to 58 μm.

By the average particle size $D_{50}$ is meant within the framework of this invention the $D_{50}$ value of the cumulative frequency distribution of the volume-averaged size distribution function, as obtained using laser diffraction methods. The $D_{50}$ value indicates that 50% of the metal pigments have a diameter which is equal to or smaller than the measured value. Correspondingly, the $D_{90}$ value indicates that 90% of the metal pigments have a diameter which is equal to or smaller than the measured value. Furthermore, the $D_{10}$ value indicates that 10% of the metal pigments have a diameter which is equal to or smaller than the measured value.

The device from Quantachrome (device: Cilas 1064) is preferably used for the measurement and evaluation.

In a further embodiment the metal pigments to be used in the plastics composition according to the invention can be provided with a surface modification which can influence e.g. the orientation behavior of the metal pigments. One or more silanes can be applied as surface modification. The silanes can be alkyl silanes with branched or unbranched alkyl radicals with 1 to 24 C atoms, preferably 6 to 18 C atoms.

However, the silanes can also be organofunctional silanes which make a chemical bonding to the plastic possible. These organofunctional groups can also be called coupling groups or functional binding groups and are preferably selected from the group which consists of hydroxy, amino, acryl, methacryl, vinyl, epoxy, isocyanate, cyano and mixtures thereof.

The organofunctional silanes preferably used as surface modifier, which have suitable functional groups, are commercially available and are produced for example by Evonik and sold under the trade name "Dynasylan". Further products can be procured from Momentive (Silquest silanes) or from Wacker, for example standard and α silanes from the GENIOSIL product group.

Examples of these are 3-methacryloxypropyltrimethoxysilane (Dynasylan MEMO, Silquest A-174NT), vinyltri(m)ethoxysilane (Dynasylan VTMO and VTEO respectively, Silquest A-151 and A-171 respectively), methyltri(m)ethoxysilane (Dynasylan MTMS and MTES respectively), 3-mercaptopropyltrimethoxysilane (Dynasylan MTMO; Silquest A-189), 3-glycidoxypropyltrimethoxysilane (Dynasylan GLYMO, Silquest A-187), tris[3-(trimethoxysilyl)propyl] isocyanurate (Silquest Y-11597), bis[3-(triethoxysilyl)propyl]tetrasulfide (Silquest A-1289), bis[3-(triethoxysilyl)propyl]disulfide (Silquest A-1589), beta-(3,4-epoxycyclohexyl) ethyltrimethoxysilane (Silquest A-186), bis(triethoxysilyl) ethane (Silquest Y-9805), gamma-isocyanatopropyltrimethoxysilane (Silquest A-Link 35, GENIOSIL GF40), methacryloxymethyltri(m)ethoxysilane (GENIOSIL XL 33, XL 36), (methacryloxymethyl)(m)ethyldimethoxysilane (GENIOSIL XL 32, XL 34), (isocyanatomethyl)methyldimethoxysilane, (isocyanatomethyl)trimethoxysilane, 3-(triethoxysilyl)propylsuccinic anhydride (GENIOSIL GF 20), (methacryloxymethyl)methyldiethoxysilane, 2-acryloxyethylmethyldimethoxysilane, 2-methacryloxyethyltrimethoxysilane, 3-acryloxypropylmethyldimethoxysilane, 2-acryloxyethyltrimethoxysilane, 2-methacryloxyethyltriethoxysilane, 3-acryloxypropyltrimethoxysilane, 3-acryloxypropyltripropoxysilane, 3-methacryloxypropyltriethoxysilane, 3-methacryloxypropyltriacetoxysilane, 3-methacryloxypropylmethyldimethoxysilane, vinyltrichlorosilane, vinyltrimethoxysilane (GENIOSIL XL 10), vinyltris(2-methoxyethoxy)silane (GENIOSIL GF 58), vinyltriacetoxysilane or mixtures thereof.

3-Methacryloxypropyltrimethoxysilane (Dynasylan MEMO, Silquest A-174NT), vinyltri(m)ethoxysilane (Dynasylan VTMO and VTEO respectively, Silquest A-151 and A-171 respectively), methyltri(m)ethoxysilane (Dynasylan MTMS and MTES respectively), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloxymethyltri(m)ethoxysilane (GENIOSIL XL 33, XL 36), (methacryloxymethyl)(m)ethyldimethoxysilane (GENIOSIL XL 32, XL 34), 3-(triethoxysilyl)propylsuccinic anhydride (GENIOSIL GF 20), vinyltrimethoxysilane (GENIOSIL XL 10) and/or vinyltris(2-methoxyethoxy)silane (GENIOSIL GF 58) are preferably used as organofunctional silanes.

In a preferred embodiment the organofunctional silane mixture contains at least one aminofunctional silane in addition to at least one silane without functional binding group. The amino function is a functional group which can enter into one or more chemical interactions with most groups present in binders. This can include a covalent bond, such as e.g. with isocyanate or carboxylate functions of the binder, or hydrogen bridge bonds such as with OH or COOR functions or also ionic interactions. An amino function is therefore very suitable for the purpose of chemically bonding the pigment to different binders.

The following compounds are preferably used for this: 3-aminopropyltrimethoxysilane (Dynasylan AMMO; Silquest A-1110), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest A-1637), N-cyclohexylaminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973) or mixtures thereof.

In a furthermore preferred embodiment the silane without functional binding group is an alkyl silane. The alkyl silane preferably has the formula $R_{(4-z)}Si(X)_z$. Here, z is a whole number from 1 to 3, R is a substituted or unsubstituted, unbranched or branched alkyl chain with 10 to 22 C atoms and X stands for a halogen and/or alkoxy group. Alkyl silanes with alkyl chains with at least 12 C atoms are preferred. R can also be bound cyclically to Si, wherein in this case z is usually 2.

In addition to the mentioned silanes or silane mixtures, further organic chemical modifiers, such as for example substituted or non-substituted alkyl radicals, polyethers, thioethers, siloxanes, etc. and mixtures thereof, can also be used.

Within the framework of the present invention, for example, polyolefins, polystyrenes, polyesters, polyethers, polyamides, poly(meth)acrylates, thermoplastic polyurethanes, polysulfones, polyacetals, polyvinyl chloride, mixtures or copolymers thereof can be used as plastics component. Polypropylene (PP), polyethylene (PE), polyamide (PA), polybutylene terephthalate (PBT), polyethylene terephthalate (PET), glycol-modified polycyclohexylenemethylene terephthalates (PCTG), polysulfone (PSU), polymethyl methacrylate (PMMA), thermoplastic polyurethane (TPU), acrylonitrile-butadiene-styrene (ABS), acrylonitrile-styrene-acrylate (ASA), acrylonitrile-ethylene-propylene-styrene (AES), styrene-maleic anhydride (SMA) or high impact polystyrene (HIPS) are preferably used.

In a further embodiment the following plastics can be used in the plastics composition according to the invention:

1. Polymers based on/derived from monoolefins and diolefins, e.g. polypropylene (PP), polyisobutylene (PIB), polybut-1-ene, poly-4-methylpent-1-ene (PMP), polyvinylcyclohexane (PVCH), polyisoprene or polybutadiene, as well as polymers of cycloolefins, e.g. cyclopentenes or norbornenes, polyethylenes (optionally also cross-linked), e.g. High Density Polyethylene (HDPE), High Density High Molecular Weight Polyethylene (HDPE-HMW), High Density and Ultrahigh Molecular Weight Polyethylene (HDPE-UHMW), Medium Density Polyethylene (MDPE), Low Density Polyethylene (LDPE), Linear Low Density Polyethylene (LLDPE), (VLDPE) and (ULDPE). The polymers of monoolefins, represented simplified in this paragraph, in particular polyethylene and polypropylene, can be produced using various methods:
   a) Radical polymerization (normally under high pressure and at elevated temperature).
   b) Catalytic polymerization using a catalyst normally containing one or more metals of group IVb, Vb, VIb or VIII of the periodic table. These metals usually have one or more ligands, typically oxides, halides, alcoholates, esters, ethers, amines, alkyls, alkenyl and/or aryls, which are either π- or σ-coordinated. These metal complexes can be present free or bonded to a substrate, typically to an activated magnesium chloride, titanium (III)chloride, aluminum or silicon oxide. These catalysts can be soluble or insoluble in the polymerization medium. The catalysts can themselves be used or further activators can be used, typically metal alkyls, metal hydrides, metal-alkyl halides, metal-alkyl oxides or metal-alkyl oxanes, wherein the named metals originate from element groups Ia, IIa and/or IIIa of the periodic table. The activators can be further modified with esters, ethers, and amines or silyl ether groups. These catalyst systems are usually called Phillips, Standard Oil Indiana, Ziegler-Natta, TNZ (DuPont), metallocene catalysts or Single Site Catalysts (SSC).

2. Mixtures of polymers mentioned under 1), e.g. mixtures of polypropylene with polyisobutylene, polypropylene with polyethylene (e.g. PP/HDPE, PP/LDPE) and mixtures of different types of polyethylene (e.g. LDPE/HDPE).

3. Copolymers of monoolefins and diolefins with each other or with other vinyl monomers, e.g. ethylene/propylene copolymers, Linear Low Density Polyethylene (LLDPE) and mixtures thereof with Low Density Polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene such as COC), ethylene/1-olefin copolymers, wherein the 1-olefin is generated in-situ; propylene/butadiene copolymers, isobutylene/isoprene copolymers, ethylene/vinylcyclohexene copolymers, ethylene/alkylacrylate copolymers, ethylene/alkylmethacrylate copolymers, ethylene/vinyl acetate copolymers or ethylene/acrylic acid copolymers and salts thereof (ionomers) as well as terpolymers of ethylene with propylene and a diene such as hexadiene, dicyclopentadiene or ethylidenenorbornene; and mixtures of such copolymers with each other and with polymers mentioned under 1), e.g. polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or statistical polyalkylene/carbon monoxide copolymers and mixtures thereof with other polymers, e.g. polyamides.

4. Hydrocarbon resins (e.g. $C_5$-$C_9$) including hydrogenated modifications thereof (e.g. tackifiers) and mixtures of polyalkylenes and starch.

The above-mentioned homopolymers and copolymers can also have any stereostructure, e.g. syndiotactic, isotactic, hemiisotactic or atactic; wherein atactic polymers are preferred. Stereoblock polymers are also contained.

5. Polystyrene, poly-(p-methylstyrene), poly-(α-methylstyrene).

6. Aromatic homopolymers and copolymers, derived from vinylaromatic monomers containing styrene, α-methylstyrene, all isomers of vinyltoluene, in particular p-vinyltoluene, all isomers of ethylstyrene, propylstyrene, vinylbiphenyl, vinylnaphthalene and vinylanthracene, and mixtures thereof. Homopolymers and copolymers can form any stereostructure, which can be syndiotactic, isotactic, hemiisotactic or atactic, wherein atactic polymers are preferred. Stereoblock polymers are included.
   a) Copolymers containing the mentioned vinylaromatic monomers and comonomers of ethylene, propylene, dienes, nitriles, acids, maleic anhydride, maleimide, vinyl acetate and vinyl chloride or acryl derivatives and mixtures thereof, e.g. styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methylacrylate; mixtures of styrene copolymers with high impact resistance and further polymer, e.g. polyacrylate, diene polymer or ethylene/propylene/diene terpolymer; and styrene block copolymers such as styrene/butadiene/styrene, styrene/isoprene/styrene, styrene/ethylene/butylene/styrene or styrene/ethylene/propylene/styrene.

b) Hydrogenated aromatic polymers based on the hydrogenation of polymers mentioned under 6.), in particular polycyclohexylethylene (PCHE), produced by hydrogenation of atactic polystyrene, often also called polyvinylcyclohexane (PVCH).

c) Hydrogenated aromatic polymers based on the hydrogenation of polymers mentioned under 6.a). Homopolymers and copolymers can have any stereostructure, which can be syndiotactic, isotactic, hemiisotactic or atactic, wherein atactic polymers are preferred. Stereoblock polymers are included.

7. Graft copolymers of vinylaromatic monomers, such as styrene or α-methylstyrene, e.g. styrene on polybutadiene, styrene on polybutadiene-styrene or polybutadiene-acrylonitrile copolymers; styrene and acrylonitrile (or methacrylonitrile) on polybutadiene; styrene, acrylonitrile and methylmethacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with copolymers listed under 6), e.g. the copolymer mixtures known as ABS, MBS, ASA or AES polymers.

8. Halogen-containing polymers, such as polychloroprene, chlorinated elastomers, chlorinated and brominated copolymer of isobutylene-isoprene (halogen butyl rubber), chlorinated or sulfochlorinated polyethylene, copolymers of ethylene and chlorinated ethylene, epichlorohydrin homo- and copolymers, in particular polymers of halogen-containing vinyl compounds, e.g. polyvinyl chloride (PVC), polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof, such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, e.g. acrylonitrile/butadiene copolymers, acrylonitrile/alkyl acrylate copolymers, acrylonitrile/alkoxyalkyl acrylate or acrylonitrile/vinylhalide copolymers or acrylonitrile/alkyl methacrylate/butadiene terpolymers.

11. Polymers derived from unsaturated alcohols and amines or acyl derivatives or acetals thereof, e.g. polyvinyl alcohol (PVOH), polyvinyl acetate (PVAc), polyvinyl stearate, polyvinyl benzoate, polyvinyl maleate, polyvinyl butyral (PVB), polyallyl phthalate or polyallyl melamine; as well as their copolymers with olefins mentioned under 1).

12. Homopolymers and copolymers of cyclic ethers, such as polyalkylene glycols, polyethylene oxide, polypropylene oxide or copolymers thereof with bisglycidyl ethers.

13. Polyacetals, such as polyoxymethylene (POM) and those polyoxymethylenes that contain ethylene oxide as comonomer; polyacetals, modified with thermoplastic polyurethanes (TPU), acrylates or MBS.

14. Polyphenylene oxides (PPO) and polyphenylene sulfides and mixtures of polyphenylene oxides with styrene polymers or polyamides.

15. Polyamides and copolyamides, derived from diamines and dicarboxylic acids and/or from aminocarboxylic acids or the corresponding lactams, e.g. polyamide 4, polyamide 6, polyamide 6/6, 6/10, 6/9, 6/12, 4/6, 12/12, polyamide 11, polyamide 12, aromatic polyamides originating from m-xylene diamine and adipic acid; polyamides produced from hexamethylene diamine and isophthalic acid and/or terephthalic acid and with or without an elastomer as modifier, e.g. poly-2,4,4,-trimethylhexamethyleneterephthalamide or poly-m-phenylene-isophthalamide; and also block copolymers of the mentioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides which are condensed during processing (RIM polyamide systems).

16. Polyureas, polyimides, polyamide imides, polyether imides, polyester imides, polyhydantoins and polybenzimidazoles.

17. Polyesters, derived from dicarboxylic acids and diols and/or from hydroxycarboxylic acids or the corresponding lactones, e.g. polyethylene terephthalate, polybutylene terephthalate, poly(1,4-dimethylolcyclohexane-terephthalate), polyalkylene naphthalate (PAN) and polyhydroxybenzoates, as well as block copolyether esters based on/derived from hydroxy-terminated polyethers; and also polyesters modified with polycarbonates or MBS.

18. Polyphenylene oxides and polyphenylene sulfides, and mixtures of polyphenylene oxides with styrene polymers or polyamides.

19. Polyurethanes, derived from hydroxyl-terminated polyethers, polyesters or polybutadienes on the one hand and aromatic polyisocyanates on the other hand, as well as precursors thereof.

20. Polyureas, polyimides, polyamide imides, polyether imides, polyester imides, polyhydantoins and polybenzimidazoles.

21. Polyesters, derived from dicarboxylic acids and diols and/or derived from hydroxycarboxylic acids of the corresponding lactones, e.g. polyethylene terephthalate, polybutylene terephthalate, poly(1,4-dimethylolcyclohexaneterephthalate), polyalkylene naphthalate (PAN) and polyhydroxy benzoates, as well as block copolyether esters derived from hydroxyl-terminated polyethers; as well as polyesters modified with polycarbonates or MBS.

22. Polycarbonates and polyester carbonates.

23. Polysulfones, polyether sulfones and polyether ketones.

24. Cross-linked polymers, derived from aldehydes on the one hand and phenols, ureas and melamines on the other hand, such as phenol/formaldehyde resins, urea/formaldehyde resins and melamine/formaldehyde resins.

25. Drying and non-drying alkyd resins.

26. Unsaturated polyester resins, derived from copolyesters of saturated and unsaturated dicarboxylic acids with polyalcohols and vinyl compounds as cross-linking agents, and also halogen-containing modifications with low flammability.

27. Cross-linkable acrylic resins derived from substituted acrylates, e.g. epoxy acrylates, urethane acrylates or polyester acrylates.

28. Alkyd resins, polyester resins and acrylate resins which are cross-linked with melamine resins, urea resins, isocyanates, isocyanurates, polyisocyanates or epoxy resins.

29. Cross-linked epoxy resins, derived from aliphatic, cycloaliphatic, heterocyclic or aromatic glycidyl compounds, e.g. products of diglycidyl ethers of bisphenol A and bisphenol F, which are cross-linked with conventional hardeners such as anhydrides or amines, with or without accelerators.
30. Natural polymers, such as cellulose, rubber, gelatins and chemically modified homologous derivatives thereof, e.g. cellulose acetates, cellulose propionates and cellulose butyrates, or the cellulose ethers such as methyl cellulose; as well as colophonium and derivatives thereof.
31. Mixtures of the previously mentioned polymers (polymer blends), e.g. PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/TPU, PC/TPU, POM/acrylate, POM/MBS, PPO/HIPS, PPO/PA 6.6 and copolymers, PA/HDPE, PA/PP, PA/PPO, PBT/PC/ABS or PBT/PET/PC.
32. Naturally occurring and synthetic organic materials which are completely monomeric compounds or mixtures of such compounds, e.g. mineral oils, animal and vegetable fats, oils and waxes or oils, fats and waxes based on synthetic esters (e.g. phthalates, adipates, phosphates or trimellitates) and also mixtures of synthetic ester mixtures with mineral oil in all weight ratios, typically those of spin agents, as well as aqueous emulsions of these materials.
33. Aqueous emulsions of natural or synthetic rubber, e.g. natural latex or latexes of carboxylated styrene/butadiene copolymers.

Preferably used as plastics component are polypropylene (PP), PP copolymers, polyethylene (PE), PE copolymers, HDPE, LDPE, LLDPE or other polyolefins, polystyrene (PS), SAN, HIPS, acrylonitrile-butadiene-styrene (ABS), ASA or other styrene copolymers, polycarbonate, polymer blends such as PC/ABS or PC/ASA, polyoxymethylene (POM), polyamides (PA6, PA6.6, PA11, PA12, etc.), polyesters such as PET, PBT, polyurethanes, thermoplastic polyurethanes (TPU), polymethyl methacrylate (PMMA) as well as other acrylate polymers, acrylate copolymers, polyvinyl chloride (PVC), silicones and elastomers.

The plastics compositions according to the invention can contain additives, such as pigments, dyes, light stabilizers, antioxidants, co-stabilizers such as acid traps (e.g. metal stearates, hydrotalcites, metal oxides, metal deactivators, phosphites), plasticizers, flame retardants, or mixtures thereof, in addition to the metal pigments to be used.

To achieve specific color effects, colorants and/or effect pigments and/or mixtures thereof can be added to the plastics compositions according to the invention. Colorants and/or effect pigments and/or mixtures thereof are preferably used in a quantity from a range of from 0.01 to 10 wt.-%, particularly preferably from a range of from 0.1 to 5 wt.-% and quite particularly preferably from a range of from 1 to 5 wt.-%, in each case relative to the proportion by weight of the plastics composition.

For example commercially available pearlescent pigments based on coated natural mica platelets, based on coated synthetic mica platelets, such as e.g. the product group SYMIC, from ECKART GmbH, or based on coated glass platelets, such as e.g. the product group LUXAN, from ECKART GmbH, can be used as effect pigments. Alternatively or additionally, optionally coated metal effect pigments based on copper or gold bronze platelets, e.g. from the product groups STANDART, STAPA, SILVERSHINE, in each case from ECKART GmbH, can be used. The colorants can also be selected from inorganic or organic pigments as well as organic dyes which are characterized via the color indices below.

CI Pigment White: 4, 5, 7,
CI Pigment Yellow: 1, 3, 5, 10, 12, 13, 14, 16, 17, 23, 42, 55, 61, 62, 65, 73, 74, 81, 83, 93, 94, 95, 108, 109, 110, 111, 114, 120, 126, 127, 128, 129, 138, 139, 147, 150, 151, 154, 155, 168, 173, 174, 175, 176, 177, 180, 181, 183, 185, 188, 191, 191:1, 194, 199, 214,
CI Solvent Yellow 16, 19, 21, 25, 29, 32, 34, 47, 56, 79, 81, 82, 88, 89, 93, 98, 129, 130, 135, 145, 160, 162, 174,
CI Pigment Orange: 5, 13, 31, 34, 36, 37, 38, 43, 46, 51, 61, 62, 64, 65, 67, 68, 71, 72, 74,
CI Solvent Orange 3, 5, 6, 11, 14, 25, 41, 54, 56, 59, 60, 62, 86, 99, 102,
CI Pigment Red: 2, 3, 4, 5, 8, 9, 10, 12, 14, 23, 38, 48:1, 48:2, 48:3, 48:4, 49, 52, 53:1, 53:3, 57:1, 81, 88, 95, 101, 102, 112, 122, 123, 144, 146, 149, 166, 170, 171, 175, 176, 177, 178, 179, 185, 187, 188, 190, 202, 206, 208, 209, 210, 214, 220, 221, 224, 242, 247, 253, 254, 255, 259, 262, 264, 272,
CI Solvent Red 1, 7, 23, 24, 27, 49, 52, 109, 111, 118, 119, 122, 125, 127, 130, 132, 135, 160, 179, 181, 195,
CI Pigment Brown: 23, 25,
CI Solvent Brown 1, 3, 20, 28, 42, 43, 44, 58,
CI Pigment Violet: 15, 16, 19, 23, 29, 32, 37, 42,
CI Solvent Violet 2, 8, 9, 13, 24, 36,
CI Pigment Blue: 15, 15:1, 15:3, 29, 56, 60, 61,
CI Solvent Blue 4, 10, 21, 35, 38, 48, 64, 67, 70, 97,
CI Pigment Green: 7, 36,
CI Solvent Green 3, 5, 7, 28,
CI Pigment Black: 10,
CI Solvent Black 3, 5, 6, 7, 27, 28, 29, 34, 45, 47.

If dark plastics compositions are desired, these can be achieved by admixing preferably brown and/or black color pigments and/or brown and/or black dyes in the presence of at least one platelet-shaped metal pigment. Such plastics compositions according to the invention, which are exposed for example to solar irradiation, surprisingly exhibit only very low rises in the surface temperature compared with plastics compositions without platelet-shaped metal pigments.

Plastics compositions which are provided with brown and/or black color pigments and/or brown and/or black dyes are normally exposed to high rises in heat because of their strong absorption of solar radiation.

As the plastics composition according to the invention is also to be able to be used in external applications or applications which are exposed to direct sunlight, at least one light stabilizer and at least one antioxidant are to be added to the according to the invention. The light stabilizers here can be differentiated into UV absorbers and sterically hindered amines.

The following, among other things, can be used as light stabilizers in the plastics composition according to the invention:

UV absorbers
2-(2'-hydroxyphenyl)-benzotriazoles, for example
2-(2H-benzotriazol-2-yl)-p-cresol (CAS Reg. No. [2440-22-4])
2-(2H-benzotriazol-2-yl)-4,6-bis(1-methyl-1-phenylethyl)phenol (CAS Reg. No. [70321-86-7])
2-(5-chloro-2H-benzotriazol-2-yl)-6-(1,1-dimethylethyl)-4-methylphenol (CAS Reg. No. [3896-11-5])
2,4-di-tert-butyl-6-(5-chlorobenzotriazol-2-yl)phenol (CAS Reg. No. [3864-99-1])

2-(2H-benzotriazol-2-yl)-4,6-ditertpentylphenol (CAS Reg. No. [25973-55-1])

2-(2H-benzotriazol-2-yl)-4-(1,1,3,3-tetramethylbutyl)phenol (CAS Reg. No. [3147-75-9])

2,2"-methylenebis-(6-(2H-benzotriazol-2-yl)-4,1,3,3-tetramethylbutyl)phenol (CAS Reg. No. [103597-45-1])

2-(2H-benzotriazol-2-yl)-6-dodecyl-4-methylphenol, branched and linear (CAS Reg. No. [23328-53-2/125304-04-3/104487-30-1])

2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazol-2-yl-phenol]; esterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$ wherein R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)phenyl] benzotriazole; 2-[2'-hydroxy-3'-(1,1,3,3-tetramethylbutyl)-5'-(α,α-dimethylbenzyl)phenyl] benzotriazole.

2-hydroxybenzophenones, for example 2-hydroxy-4-(n-octyloxy)benzophenone (CAS Reg. No. [1843-05-6])

4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives.

Esters of unsubstituted or substituted benzoic acids, e.g. 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Acrylates, e.g.

α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methylindoline.

Oxalic Acid Diamides, for Example

N-(2-ethoxyphenyl)-N'-(2-ethylphenyl)ethanediamide (CAS Reg. No. [23949-66-8])

4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and mixtures thereof with 2-ethoxy-2'-ethyl-5,4'-di-tert-butoxanilide, mixtures of o- and p-methoxy- and also of o- and p-ethoxy-di-substituted oxanilides.

2-(2-Hydroxyphenyl)-1,3,5-Triazines, for Example 2-(4,6-diphenyl-1,3,5-triazin-2-yl)-5-[(hexyl)oxy]-phenol (CAS Reg. No. [174315-50-2]), 3-(diaryl)[1,3,5]triazin-2-yl)-5-(alkoxy-substituted)-phenol, 2,4-bis(2,4-dimethylphenyl)-6-(2-hydroxy-4-iso-octyloxyphenyl)-s-triazine (CAS Reg. No. [137759-38-7])

2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Formamidines, for Example

4-[[[methylphenylamino]methylene]amino]benzoic acid ethyl ester (CAS Reg. No. [57834-33-0])

Sterically Hindered Amines, for Example bis(2,2,6,6-tetramethyl-4-piperidyl) sebacate (CAS Reg. No. [52829-07-9])

bis(1,2,2,6,6-pentamethyl-4-piperidyl) sebacate+methyl 1,2,2,6,6-pentamethyl-4-piperidyl sebacate (CAS Reg. No. [41556-26-7 and 82919-37-7])

bis(1-octyloxy-2,2,6,6-tetramethyl-4-piperidyl) sebacate, reaction products with 1,1-dimethylethyl hydroperoxide and octane (CAS Reg. No. [129757-67-1])

poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (CAS Reg. No. [71878-19-8])

N,N'-bis(2,2,6,6-tetramethyl-4-piperidinyl)-1,6-hexanediamine, polymer with 2,4,6-trichloro-1,3,5-triazine, reaction product with N-butyl-1-butanamine and N-butyl-2,2,6,6-tetramethyl-4-piperidinamine (CAS Reg. No. [192268-64-7])

N,N'''-[1,2-ethane-diyl-bis[[[4,6-bis-[butyl (1,2,2,6,6-pentamethyl-4-piperidinyl)amino]-1,3,5-triazin-2-yl]imino]-3,1-propanediyl]]bis[N',N''-dibutyl-N',N''-bis(1,2,2,6,6-pentamethyl-4-piperidinyl)-1,3,5-triazine-2,4,6-triamine (CAS Reg. No. [106990-43-6])

N,N'-bis(2,2,6,6-tetramethyl-4-piperidinyl)-1,6-hexanediamine, polymer with 2,4,6-trichloro-1,3,5-triazine, reaction products with 3-bromo-1-propene, N-butyl-1-butanamine and N-butyl-2,2,6,6-tetramethyl-4-piperidinamine, oxidized, hydrogenated (CAS Reg. No. [247243-62-6])
butanedioic acid dimethyl ester, polymer with 4-hydroxy-2,2,6,6-tetramethyl-1-piperidineethanol (CAS Reg. No. [65447-77-0])
bis-(1,2,2,6,6-pentamethyl-4-piperidinyl)-[[3,5-bis(1,1-dimethylethyl)-4-hydroxyphenyl]methyl]butylmalonate (CAS Reg. No. [63843-89-0])
Hostavin N30: polymer of 2,2,4,4-tetramethyl-7-oxa-3,20-diazadispiro[5.1.11.2]heneicosan-21-one and epichlorohydrin (CAS Reg. No. [202483-55-4])
Hostavin N20: 2,2,4,4-tetramethyl-21-oxo-7-oxa-3,20-diazadispiro[5.1.11.2]heneicosane (CAS Reg. No. [64338-16-5])
Cyassorb UV-3529: N,N'-bis(2,2,6,6-tetramethyl-4-piperidinyl)-1,6-hexanediamine, polymers with morpholine-2,4,6-trichloro-1,3,5-triazine (CAS Reg. No. [193098-40-7])
Uvinul 5050 H for PP: alpha-alkenes, C20-24, polymers with maleic anhydride, reaction products with 2,2,6,6-tetramethyl-4-piperidinamine (CAS Reg. No. [152261-33-1])
Uvinul 4050: 1,6-hexamethylene-bis[N-formyl-N-(2,2,6,6-tetramethylpiperidin-4-yl)amine] (CAS Reg. No. [124172-53-8])
bis(2,2,6,6-tetramethylpiperid-4-yl)succinate, bis(1,2,2,6,6-pentamethylpiperid-4-yl)sebacate, bis(1-octyloxy-2,2,6,6-tetramethylpiperid-4-yl)sebacate, n-butyl-3,5-di-tert-butyl-4-hydroxybenzylmalonic acid-bis(1,2,2,6,6-pentamethylpiperidyl)ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensation products of N,N'-bis(2,2,6,6-tetramethyl-4-piperidyl)hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and 4-butylamino-2,2,6,6-tetramethylpiperidine (CAS Reg. No. [136504-96-6]); condensation product of 1,6-diaminohexane and 2,4,6-trichloro-1,3,5-triazine and N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride-a-olefin copolymer and 2,2,6,6-tetramethyl-4-aminopiperidine or 1,2,2,6,6-pentamethyl-4-aminopiperidine.

In addition, radical traps can also be used as light stabilizers in the plastics composition according to the invention, among other things nickel compounds, such as e.g. nickel complexes of 2,2'-thio-bis[4-(1,1,3,3-tetramethylbutyl)phenol], such as the 1:1 or 1:2 complex, optionally with additional ligands, such as n-butylamine, triethanolamine or N-cyclohexyldiethanolamine, nickeldibutyldithiocarbamate, nickel salts of 4-hydroxy-3,5-di-tert-butylbenzylphosphonic acid monoalkyl esters, such as methyl or ethyl ester, nickel complexes of ketoximes, such as 2-hydroxy-4-methylphenylundecylketoxime, nickel complexes of 1-phenyl-4-lauroyl-5-hydroxypyrazol, optionally with additional ligands.

The following are preferably used as UV absorbers:
2-(2H-benzotriazol-2-yl)-p-cresol (CAS Reg. No. [2440-22-4]),
2-(2H-benzotriazol-2-yl)-4,6-bis(1-methyl-1-phenylethyl)phenol (CAS Reg. No. [70321-86-7]),
2-(5-chloro-2H-benzotriazol-2-yl)-6-(1,1-dimethylethyl)-4-methylphenol (CAS Reg. No. [3896-11-5]),
2,4-di-tert-butyl-6-(5-chlorobenzotriazol-2-yl)phenol (CAS Reg. No. [3864-99-1]),
2-(2H-benzotriazol-2-yl)-4,6-ditertpentylphenol (CAS Reg. No. [25973-55-1]),
2,2'-methylenebis-(6-(2H-benzotriazol-2-yl)-4,1,3,3-tetramethylbutyl)phenol (CAS Reg. No. [103597-45-1]),
N-(2-ethoxyphenyl)-N'-(2-ethylphenyl)ethanediamide (CAS Reg. No. [23949-66-8]),
2-(2H-benzotriazol-2-yl)-6-dodecyl-4-methylphenol, branched and linear, (CAS Reg. No. [23328-53-2/125304-04-3/104487-30-1]),
2-(4,6-diphenyl-1,3,5-triazin-2-yl)-5-[(hexyl)oxy]-phenol (CAS Reg. No. [174315-50-2]), 3-(diaryl)[1,3,5]triazin-2-yl)-5-(alkoxy-substituted) phenol,
2,4-bis(2,4-dimethylphenyl)-6-(2-hydroxy-4-iso-octyloxyphenyl)-s-triazine (CAS Reg. No. [137759-38-7]),
4-[[[methylphenylamino]methylene]amino]benzoic acid ethyl ester (CAS Reg. No. [57834-33-0]).

The following are preferably used as sterically hindered amines:
bis(2,2,6,6-tetramethylpiperid-4-yl) sebacate (CAS Reg. No. [52829-07-9]),
bis(1,2,2,6,6-pentamethyl-4-piperidyl) sebacate+methyl 1,2,2,6,6-pentamethyl-4-piperidyl) sebacate (CAS Reg. No. [41556-26-7 and 82919-37-7]),
decanedioic acid, bis(2,2,6,6-tetramethyl-1-(octyloxy)-4-piperidinyl) ester, reaction products with 1,1-dimethylethyl hydroperoxide and octane (CAS Reg. No. [129757-67-1]), poly[[6-[(1,1,3,3-tetramethylbutyl)amino]-1,3,5-triazine-2,
4-diyl][(2,2,6,6-tetramethyl-4-piperidinyl)imino]-1,6-
hexanediyl[(2,2,6,6-tetramethyl-4-piperidinyl)imino]]
(CAS Reg. No. [71878-19-8]), N,N'-bis(2,2,6,6-tetramethyl-4-piperidinyl)-1,6-hexanediamine, polymer with 2,4,6-trichloro-1,3,5-triazine, reaction product with N-butyl-1-butanamine and N-butyl-2,2,6,6-tetramethyl-4-piperidinamine (CAS Reg. No. [192268-64-7]), N,N'''-[1,2-ethane-diyl-bis[[[4,6-bis-[butyl (1,2,2,6,6-pentamethyl-4-piperidinyl)amino]-1,3,5-triazin-2-yl]imino]-3,1-propanediyl]]bis[N',N''-dibutyl-N',N''-bis(1,2,2,6,6-pentamethyl-4-piperidinyl)-1,3,5-triazine-2,4,6-triamine (CAS Reg. No. [106990-43-6]), butanedioic acid dimethyl ester, polymer with 4-hydroxy-2,2,6,6-tetramethyl-1-piperidineethanol (CAS Reg. No. [65447-77-0]), bis(1,2,2,6,6-pentamethyl-4-piperidinyl)-[[3,5-bis(1,1-dimethylethyl)-4-hydroxyphenyl]methyl]butylmalonate (CAS Reg. No. [63843-89-0]), Hostavin N30 (CAS Reg. No. [202483-55-4]),
Hostavin N20: (CAS Reg. No. [64338-16-5]),
Cyassorb UV-3529: (CAS Reg. No. [193098-40-7]),
Uvinul 5050 H for PP: (CAS Reg. No. [152261-33-1]),
Uvinul 4050 (CAS Reg. No. [124172-53-8]).

The following can be added to the plastics composition according to the invention as antioxidants:

1.1. Alkylated monophenols, e.g. 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonyl phenols with linear or also branched side chains, e.g. 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, e.g. 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, e.g. 2,6-di-tert-butyl-4-methoxyphenol, 2,5-di-tert-butylhydroquinones, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, e.g. α-tocopherol, β-tocopherol, γ-tocopherol, δ-tocopherol and mixtures thereof (vitamin E).

1.5. Hydroxylated thiodiphenyl ethers, e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidene bisphenols, e.g. 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethyleneglycol-bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, e.g. 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-utyl-4-hydroxybenzyl)sulfide, isooctyl-3,5-di-tert-butyl-4-hydroxybenzylmercaptoacetate.

1.8. Hydroxybenzylated malonates, e.g. dioctadecyl-2,2-bis (3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, e.g. 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, e.g. 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, e.g. dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salts of the monoethyl esters of 3,5-di-tert-butyl-4-hydroxybenzylphosphonic acid.

1.12. Acylaminophenols, e.g. 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyalcohols, e.g. with methanol, ethanol, n-octanol, i-octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono-polyalcohols, e.g. with methanol, ethanol, n-octanol, i-octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or polyalcohols, e.g. with methanol, ethanol, octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2, 6,7-trioxabicyclo[2.2.2]octane.

1.16. Esters of 3,5-di-tert-butyl-4-hydroxyphenylacetic acid with mono- or polyalcohols, e.g. with methanol, ethanol, octanol, octadecanol, 1,6-hexanediol, 1,9-nonanediol, ethyleneglycol, 1,2-propanediol, neopentylglycol, thiodiethyleneglycol, diethyleneglycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl] oxamide.

1.18. Ascorbic acid (vitamin C)

1.19. Aminic antioxidants, for example N-phenylbenzylamine, reaction product with 2,4,4-trimethylpentene (CAS Reg. No. [192268-64-7]), N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-tolylsulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenyiamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

Preferably used as antioxidants are pentaerythritol tetrakis (3-(3,5-di-tert-butyl-4-hydroxyphenyl)propionate) (CAS Reg. No. [6683-19-8]), octadecyl 3-(3,5-di-tert-butyl-4-hydroxyphenyl)propionate (CAS Reg. No. [2082-79-3]), 2-ethylpentyl 3-(3,5-di-tert-butyl-4-hydroxyphenyl)propanoate (CAS Reg. No. [125643-61-0]), ethylenebis(oxyethylene) bis(3-(5-tert-butyl-4-hydroxy-m-tolyl)propionate) (CAS Reg. No. [36443-68-2]), N,N'-hexane-1,6-diylbis(3-3,5-di-tert-butyl-4-hydroxyphenylpropionamide) (CAS Reg. No. [23128-74]), 1,3,5-tris(3,5-di-tert-butyl-4-hydroxybenzyl)-1,3,5-triazine-2,4,6(1H,3H,5H)-trione (CAS Reg. No. [27676-62-6])

N-phenylbenzeneamine, reaction product with 2,4,4-trimethylpentene (CAS Reg. No. [192268-64-7]), tris(2,4-di-tert-butylphenyl)phosphite (CAS Reg. No. [31570-04-4]), tetrakis(2,4-di-tert-butylphenyl)[1,1-biphenyl]-4,4'-diylbisphosphonite (CAS Reg. No. [119345-01-6]), bis(2,4-di-tert-butylphenyl) pentaerythritol diphosphite; 3,9-bis(2,4-bis(1,1-dimethylethyl)phenoxy)-2,4,8,10-tetraoxa-3,9-diphosphaspiro(5.5)undecane (CAS Reg. No. [26741-53-7]), bis-2,4-di-tert-butylphenyl pentaerythritol diphosphite (CAS Reg. No. [26741-53-7]), bis[2,4-bis(1,1-dimethylethyl)-6-methylphenyl]ethyl ester phosphoric acid (CAS Reg. No. [145650-60-8]).

In general all plasticizers of the substance classes phthalic acid esters; phosphoric acid esters; esters of adipic, azelaic, glutaric and sebacic acid; fatty acid esters, epoxidized fatty acid esters; citric acid esters; esters of acetic, propionic and butyric acid; esters of ethylbutyric and ethylhexanoic acid; glycolic acid esters; polyesters; halogenated hydrocarbons; aliphatic and aromatic hydrocarbons; benzoic acid esters; trimellitic acid esters; sulfonic acid esters; sulfamides; anilides; alcohols; ethers; ketones; polyethyleneglycols; abietic acid ester derivatives can be added to the plastics composition according to the invention as plasticizers. Examples of these are alkylsulfonic acid ester (ASE), butylbenzyl phthalate (BBP), butyloctyl phthalate (BOA), dibutyl phthalate (DBP), dibutyl sebacate (DBS), dicyclohexyl phthalate (DCHP), dicapryl phthalate (DCP), didecyl phthalate (DDP), diethyl phthalate (DEP), diheptyl phthalate (DHP), dihexyl phthalate (DHXP), diisobutyl phthalate (DIBP), diisodecyl adipate (DIDA), diisodecyl phthalate (DIDP), diisoheptyl phthalate (DIHP), diisohexyl phthalate (DIHXP), diisononyl adipate (DINA), diisononyl phthalate (DINP), diisooctyl adipate (DIOA), diisooctyl phthalate (DIOP), diisopentyl phthalate (DIPP), diisotridecyl phthalate (DITDP), dimethyl phthalate (DMP), di-n-octyl phthalate (DNOP), dinonyl phthalate (DNP), dioctyl adipate (DOA), dioctyl isophthalate (DOIP), dioctyl phthalate (DOP), dioctyl sebacate (DOS), dioctyl terephthalate (DOTP), dioctyl azelate (DOZ), diphenyl cresyl phosphate (DPCF), diphenyl octyl phosphate (DPOF), diisotridecyl phthalate (DTDP), diundecyl phthalate (DUP), epoxidized linseed oil (EPLO), epoxidized soya oil (EPSO), heptyl nonyl undecyl adipate (HNUA), heptyl nonyl undecyl phthalate (HNUP), hexyl octyl decyl adipate (HXODA), hexyl octyl decyl phthalate (HXODP), nonyl undecyl adipate (NUA), nonyl undecyl phthalate (NUP), octyl decyl adipate (ODA), octyl decyl phthalate (ODP), n-octyl decyl trimellitate (ODTM), trichloroethyl phosphate (TCEF), tricresyl phosphate (TCP), triisooctyl trimellitate (TIOTM), trioctyl phosphate (TOP), tetraoctyl pyromellitate (TOPM), trioctyl trimellitate (TOTM), triphenyl phosphate (TPF), trixylylene phosphate (TXF), mixed alcohol esters, arylalkyl mixed phosphates, acetyl-tributylcitrate, polyesters of (propane, butane, pentane and hexane) diols with dicarboxylic acids (phthalic acid, sebacic acid, adipic acid). Plasticizers are preferably used in a quantity from a range of from 5 to 50 wt.-%, relative to the total weight of the plastics composition, in combination with a plastics component made of PVC.

Furthermore flame retardants can be added to the plastics composition according to the invention. In general all flame retardants of the substance classes organic bromine and chlorine compounds; inorganic and organic phosphorus compounds; halogenated organic phosphates; chlorinated paraffins, chlorinated cycloaliphates; inorganic flame retardants; antimony-based flame retardants; phosphonium compounds; phosphorus-nitrogen compounds; chlorinated phthalic acid derivatives can be added. Examples of these are aluminum hydroxide, aluminum oxalate, ammonium polyphosphate, antimony oxide, boric acid, sodium tetrafluoroborate, zinc borate, ZnS, $ZnCl_2$, magnesium hydroxide, melamine, melamine cyanurate, resorcinol-bis(diphenylphosphate), dibromostyrene, decabromodiphenylether, octabromodiphenylether, hexabromodiphenylether, pentabromophenylether, hexabromodiphenoxyethane, tetrabromophthalic anhydride, tetrabromophthalic acid diol, tetrabromopolyether, ethylene-bis-tetrabromophthalimide, tetrabromobisphenol A (TBBA), TBBA-bis(2,3-dibromopropylether), TBBA-bis(2-hydroxyethylether), TBBA-bis(allylether), TBBA-bis(2-ethyletheracrylate), TBBA-carbonate-oligomer, brominated epoxy resins based on TBBA, poly(dibromophenyleneether), poly(pentabromobenzylacrylate), poly(tribromostyrene), hexabromocyclododecane, ethylene-bis(dibromonorbornane-di-carboximide), dibromoethyldibromocyclohexane, dibromoneopentylglycol, tribromoneopentylalcohol or tri(tribromophenyl)cyanurate. The flame retardants are preferably used in a quantity from a range of from 0 to 60 wt.-%, further preferably from a range of from 5 to 50 wt.-%, particularly preferably from a range of from 10 to 40 wt.-% and quite particularly preferably from a range of from 20 to 30 wt.-%, in each case relative to the total weight of the plastics composition.

Plastics are characterized by their low density. The density of the plastics composition according to the invention is increased only insubstantially, preferably less than 5%, by the addition of metal pigments to be used according to the invention. A plastics composition usually has a density of from 0.9 to 1.1 $g/cm^3$ (polyolefins<1.0 $g/cm^3$).

The plastics composition according to the invention can be present in different applications, such as e.g. as a foil or film, tape, plate or also as a profile. As the plastics composition according to the invention is also to be used in external applications or applications which are exposed to direct sunlight, it is expedient to add at least one light stabilizer to protect the plastics component.

In a preferred embodiment, the plastics composition according to the invention comprises at least one metal pigment in a quantity from a range of from 0.01 to 25 wt.-%, at least one light stabilizer in a quantity from a range of from 0.01 to 10 wt.-% and at least one antioxidant in a quantity from a range of from 0.001 to 0.5 wt.-%, in each case relative to the proportion by weight of the plastics composition. The plastics composition according to the invention particularly preferably comprises at least one metal pigment in a quantity from a range of from 0.1 to 15 wt.-%, further preferably from a range of from 0.5 to 15 wt.-%, at least one light stabilizer in a quantity from a range of from 0.05 to 10 wt.-%, further preferably from a range of from 0.7 to 7 wt.-%, and at least one antioxidant in a quantity from a range of from 0.008 to 0.4 wt.-%, further preferably from a range of from 0.01 to 0.3 wt.-%, in each case relative to the proportion by weight of the plastics composition.

In a particularly preferred embodiment, the quantity used of at least one metal pigment and at least one light stabilizer is adapted to the respective thickness of the application. If the plastics composition according to the invention is present as a foil or film with a thickness from a range of from 10 to 100 μm, the plastics composition comprises at least one metal pigment in a quantity from a range of from 0.5 to 15 wt.-%, at least one light stabilizer in a quantity from a range of from 0.01 to 10 wt.-% as well as at least one antioxidant in a quantity from a range of from 0.01 to 0.2 wt.-%, in each case relative to the proportion by weight of the foil or film. In a preferred embodiment, the foil or film with a thickness from a range of from 10 to 100 μm comprises at least one metal pigment in a quantity from a range of from 0.7 to 13 wt.-%, further preferably from a range of from 1.1 to 13 wt.-%, particularly preferably from a range of from 1.3 to 12 wt.-%, quite particularly preferably from a range of from 1.6 to 11 wt.-%, at least one antioxidant in a quantity from a range of from 0.01 to 0.2 wt.-%, in each case relative to the proportion by weight of the foil or film, as well as at least one light stabilizer, wherein the light stabilizer comprises sterically hindered amines (HALS) in a quantity from a range of from 1.1 to 7.3 wt.-%, further preferably from a range of from 1.4 to 6.9 wt.-%, particularly preferably from a range of from 1.6 to 6.4 wt.-%, quite particularly preferably from a range of from 2.1 to 5.2 wt.-% and UV absorbers in a quantity from a range of from 0.005 to 1.9 wt.-%, further preferably from a range of from 0.007 to 1.7 wt.-%, particularly preferably from a range of from 0.008 to 1.4 wt.-% and quite particularly preferably from a range of from 0.01 to 1.1 wt.-%, in each case relative to the proportion by weight of the foil or film.

If the plastics composition according to the invention is present as a foil with a thickness from a range of from 0.1 to 0.5 mm, the plastics composition comprises at least one metal pigment in a quantity from a range of from 0.5 to 10 wt.-%, at least one light stabilizer in a quantity from a range of from 0.01 to 7 wt.-%, as well as at least one antioxidant in a quantity from a range of from 0.01 to 0.2 wt.-%, in each case relative to the proportion by weight of the foil. In a preferred embodiment, the foil with a thickness from a range of from 0.1 to 0.5 mm comprises at least one metal pigment in a quantity from a range of from 0.5 to 8 wt.-%, preferably from a range of from 0.7 to 6.7 wt.-%, further preferably from a range of from 0.8 to 5.9 wt.-%, quite particularly preferably from a range of from 0.9 to 5.1 wt.-%, at least one antioxidant in a quantity from a range of from 0.01 to 0.2 wt.-%, in each case relative to the proportion by weight of the foil, as well as at least one light stabilizer, wherein the light stabilizer comprises sterically hindered amines (HALS) in a quantity from a range of from 0.01 to 4 wt.-%, preferably from a range of from 0.05 to 3 wt.-%, further preferably from a range of from 0.07 to 2.7 wt.-%, particularly preferably from a range of from 0.09 to 2.4 wt.-%, quite particularly preferably from a range of from 0.1 to 2.2 wt.-% and UV absorbers in a quantity from a range of from 0 to 2 wt.-%, preferably from a range of from 0 to 1.7 wt.-%, further preferably from a range of from 0 to 1.3 wt.-% and quite particularly from a range of from 0 to 1.1 wt.-%, in each case relative to the proportion by weight of the foil.

If the plastics composition according to the invention is present as a plate with a thickness from a range of from 0.5 to 2 mm, the plastics composition comprises at least one metal pigment in a quantity from a range of from 0.01 to 5 wt.-%, at least one light stabilizer in a quantity from a range of from 0.02 to 4 wt.-% and at least one antioxidant in a quantity from a range of from 0.01 to 0.2 wt.-%, in each case relative to the proportion by weight of the plate. In a preferred embodiment, the plate with a thickness from a range of from 0.5 to 2 mm comprises at least one metal pigment in a quantity from a range of from 0.01 to 4.3 wt.-%, preferably from a range of from 0.04 to 3.9 wt.-%, further preferably from a range of from 0.07 to 3.4 wt.-%, particularly preferably from a range of from 0.09 to 3.2 wt.-%, quite particularly preferably from a range of from 0.1 to 3 wt.-%, at least one antioxidant in a quantity from a range of from 0.01 to 0.2 wt.-%, in each case relative to the proportion by weight of the plate as well as at least one light stabilizer, wherein the light stabilizer comprises sterically hindered amines in a quantity from a range of from 0.01 to 2.7 wt.-%, preferably from a range of from 0.02 to 2.3 wt.-%, further preferably from a range of from 0.03 to 1.9 wt.-%, particularly preferably from a range of from 0.04 to 1.3 wt.-%, quite particularly preferably from a range of from 0.05 to 1.1 wt.-% and UV absorbers in a quantity from a range of from 0.05 to 3.8 wt.-%, preferably from a range of from 0.07 to 3.1 wt.-%, further preferably from a range of from 0.08 to 2.6 wt.-%, particularly preferably from a range of from 0.09 to 2.3 wt.-% and quite particularly preferably from a range of from 0.1 to 2.1 wt.-%, in each case relative to the proportion by weight of the plate.

If the plastics composition according to the invention is present as a profile with a thickness of >2 mm, the plastics composition comprises at least one metal pigment in a quantity from a range of from 0.001 to 5 wt.-%, at least one light stabilizer in a quantity from a range of from 0.1 to 7 wt.-% and at least one antioxidant in a quantity from a range of from 0.01 to 0.2 wt.-%, in each case relative to the proportion by weight of the profile. In a preferred embodiment, the profile with a thickness of >2 mm comprises at least one metal pigment in a quantity from a range of from 0.001 to 3.9 wt.-%, preferably from a range of from 0.002 to 3.5 wt.-%, further preferably from a range of from 0.004 to 3.1 wt.-%, particularly preferably from a range of from 0.008 to 2.6 wt.-%, quite particularly preferably from a range of from 0.01 to 2.3 wt.-%, at least one antioxidant in a quantity from a range of from 0.01 to 0.2 wt.-%, in each case relative to the proportion by weight of the profile and at least one light stabilizer, wherein the light stabilizer comprises sterically hindered amines (HALS) in a quantity from a range of from 0 to 0.9 wt.-%, preferably from a range of from 0 to 0.8 wt.-%, further preferably from a range of from 0 to 0.7 wt.-%, particularly preferably from a range of from 0 to 0.6 wt.-%, quite particularly preferably from a range of from 0 to 0.5 wt.-% and UV absorbers in a quantity from a range of from 0.05 to 6.7 wt.-%, preferably from a range of from 0.1 to 6.4 wt.-%, further preferably from a range of from 0.15 to 6.1 wt.-%, particularly preferably from a range of from 0.2 to 5.6 wt.-% and quite particularly preferably from a range of from 0.25 to 5.2 wt.-%, in each case relative to the proportion by weight of the profile.

Sunlight which reaches the surface of the earth as radiation can be divided essentially into three sub-ranges according to ASTM G 173-03 (2012) "Standard Air Mass 1.5 Direct Normal and Hemispherical Spectral Solar Irradiance for 37° Sun-Facing Tilted Surface": 5% of the energy arriving on the surface covers the UV spectral range (300 to 400 nm), almost 43% covers the visual range (400 to 700 nm) and 52% covers the NIR range (700 to 2500 nm).

The diffuse reflection over all solid angles was measured in the range 280 to 2500 nm using an Ulbricht integrating sphere connected to the spectrometer (device: Lambda 1050 from Perkin-Elmer). Taking into account ASTM G 173-03, the total solar reflectance (TSR) was calculated in the range of from 300 to 2500 nm.

The value for the total solar reflectance (TSR value) is increasingly gaining importance because it takes into account the entire electromagnetic wavelength spectrum of solar radiation. For the thermal heating of surfaces, however, the entire solar radiation—consisting of ultra-violet, infrared and visible radiation—must be taken into account. The total solar reflectance (TSR) is a measure of the proportion of the irradiating terrestrial solar energy reflected by a surface. This is the proportion of solar radiation energy that is reflected by a surface. The higher this value is, the more strongly the solar radiation is reflected—therefore, the smaller the temperature rise which can be measured on a coating surface after solar irradiation is compared with the ambient temperature. The smaller the TSR value, the greater the thermal heating of the surface, and the larger the TSR value, the lower the thermal heating. The TSR value is therefore inversely proportional to the heating.

In principle: surfaces of plastics which have a high reflectivity remain substantially cooler under direct solar irradiation. This counteracts the heating of the plastic and results in the surface warming up less. "Cool Plastics" therefore tend to deform less; they display an improved dimensional stability under heat. This fact opens up great potential for achieving "Cool Plastics", even in the case of very dark color shades, which is possible with the corresponding metal pigment in the plastics composition according to the invention. A high TSR efficiency—this corresponds to a low NIR absorption—results in cooler plastic surfaces.

This effect is useful both in the outdoor sector and for automobile applications such as vehicle fittings and other plastic parts in the field of vehicle interiors which are exposed to sunlight to a large extent.

The heating rate of the plastics composition according to the invention is determined analogously to ASTM D 4803-97 (Reapproved 2002) "Standard Test Method for Predicting Heat Buildup in PVC Building Products".

The plastics composition according to the invention can be processed using all the usual methods for plastics processing, e.g. injection molding, blow molding (films, hollow bodies), foaming, calendering, casting, extruding and coextrusion (more than one layer).

In the case of coextruding, the plastics composition according to the invention can be contained in one or more layers. The individual components of the plastics composition according to the invention can also be distributed in several layers.

For example, the top layer can contain HALS, UV absorbers and antioxidants, the second layer can contain the metal pigment to be used according to the invention and antioxidants or HALS, UV absorbers, antioxidants, wherein metal pigment to be used can also be present in the top layer.

The plastics compositions according to the invention can be present in a compacted form, e.g. as a pellet.

The metal pigments to be used according to the invention or the pigment mixtures can be present in powder form with 0 wt.-% to 100 wt.-%, relative to the total weight of the pigment, of active material and/or as e.g. a pellet, granular material, masterbatch, compound with 0 wt.-% to 99 wt.-%, relative to the respective total weight, of active material. By active material is meant only the pigment, without further binders, oil or plasticizers.

Pellets, granular material, masterbatch, compounds etc. are produced by compacting a mixture of the pigments/pigment mixtures according to the invention with a so-called carrier material.

The compacting can be carried out using e.g. a pelletizing disk, a tablet press, a perforated roller, a spray dryer, an extruder (single- or twin-screw extruder).

The concentration used of the pigment according to the invention/the pigment mixture according to the invention in the pellet conforms to the technical requirements and can preferably lie between 0% and 99 wt.-%, further preferably between 5% and 90 wt.-%, in each case relative to the total weight of the total formulation of the pellet.

For the pelleting, a plurality of dispersion aids, waxes, resins, plastics can be used, e.g. natural and artificial resins such as alkyd resins, carboxylmethyl and carboxylethyl cellulose resins, cellulose acetate, cellulose acetate propionate (CAP) and cellulose acetate butyrate (CAB), cumarolindene resins, epoxy esters, epoxy-melamine and epoxy-phenol condensates, ethyl and methyl cellulose, ethyl hydroxyethyl cellulose, hydroxyethyl cellulose, hydroxypropyl methylcellulose, ketone and maleic acid resins, colophony resins, melamine resins, nitrocellulose resins, phenol and modified phenol resins, polyacrylamide, polycarbonate, polyamide, polyester, polyether, polyethane or vinyl resins or mixtures thereof. Of these polymeric resins, the following are preferred in particular: acrylate copolymers and acrylic ester resins, polyacrylonitrile and acrylonitrile copolymer resins, copolymers of butadiene and vinylidene chloride, butadiene/styrene copolymers, methacrylate and methyl methacrylate copolymers, polybutene, polyisobutylene, polyvinyl acetate, polyvinyl alcohol, polyvinyl chloride, polyvinyl ether, polyvinylpyrrolidone and polystyrene resins. Further copolymers include styrene/maleic anhydride and styrene/shellac resins, vinyl chloride/vinyl acetate, vinyl chloride/vinyl ether and vinyl chloride/vinylidene chloride resins. Furthermore, naturally occurring resins such as gum arabic, gutta-percha, casein and gelatins can also be used. Aldehyde resins, such as e.g. from the Laropal series from BASF SE, Ludwigshafen, Germany, are preferred. Furthermore, waxes come into consideration as binder materials. Here, natural waxes such as beeswax, candelilla wax, carnauba wax, montan wax and paraffin wax are to be named as examples. Synthetic waxes such as, for example, polyethylene waxes likewise come into consideration. The above-named preparations can be incorporated very well into plastics, without resulting in undesired agglomerations of metal pigments, such as for example iron effect pigments.

All of the constituents to be used in the plastics composition according to the invention, as well as the plastic component and optionally further components, are used such that they make up 100 wt.-%, relative to the proportion by weight of the plastics composition.

In the plastics composition according to the invention negative influences of metal pigments on the respective plastics component, such as e.g. a faster decomposition of the plastics component in the presence of metal pigments, are mitigated by the presence, preferred according to the invention, both of a light stabilizer and of an antioxidant. This advantageously applies both to uncoated and, surprisingly, to coated metal pigments. Metal ions which can also migrate through a coating of the metal pigment and damage the plastics component are responsible for the decomposition of the plastics components. The inventors are of the opinion that preferably either the light stabilizer or the antioxidant should preferably be selected such that a metal complex with free metal ions can be formed.

In a further embodiment, the present invention relates to a plastics composition which comprises at least one platelet-shaped metal pigment, preferably an iron pigment coated with silicon oxides, silicon hydroxides and/or silicon oxide hydrates, in a quantity from a range of from 0.01 to 10.1 wt.-%, at least one light stabilizer as well as at least one antioxidant, wherein the plastics component consists of polypropylene (PP), PP copolymers, polyethylene (PE), PE copolymers, HDPE, LDPE, LLDPE or other polyolefins, wherein the at least one light stabilizer is selected from the group consisting of poly[[6-[(1,1,3,3-tetramethylbutyl) amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (CAS Reg. No. [71878-19-8]), 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS Reg. No. [192268-64-7]), butanedioic acid dimethyl ester, polymer with 4-hydroxy-2,2,6,6-tetramethyl-1-piperidineethanol (CAS Reg. No. [65447-77-0]), bis(2,2,6,6-tetramethylpiperid-4-yl) sebacate (CAS Reg. No. [52829-07-9]), Hostavin N30: polymer of 2,2,4,4-tetramethyl-7-oxa-3,20-diazadispiro[5.1.11.2]heneicosan-21-one and epichlorohydrin, (CAS Reg. No. [202483-55-4]), alpha-alkenes, C20-24, polymers with maleic anhydride, reaction products with 2,2,6,6-tetramethyl-4-piperidinamine (CAS Reg. No. [152261-33-1]), 2-(5-chloro-2H-benzotriazol-2-yl)-6-(1,1-dimethylethyl)-4-methylphenol (CAS Reg. No. [3896-11-5]), and/or mixtures thereof and wherein the at least one antioxidant is selected from the group consisting of pentaerythritol tetrakis(3-(3,5-di-tert-butyl-4-hydroxyphenyl) propionate) (CAS Reg. No. [6683-19-8]), octadecyl 3-(3,5-di-tert-butyl-4-hydroxyphenyl)propionate (CAS Reg. No. [2082-79-3]), tris(2,4-di-tert-butylphenyl)phosphite (CAS Reg. No. [31570-04-4]), tetrakis(2,4-di-tert-butylphenyl)[1,1-biphenyl]-4,4'-diylbisphosphonite (CAS Reg. No. [119345-01-6]), bis(2,4-di-tert-butylphenyl) pentaerythritol diphosphite, 3,9-bis(2,4-bis(1,1-dimethylethyl)phenoxy)-2,4,8,10-tetraoxa-3,9-diphosphaspiro(5.5)undecane (CAS Reg. No. [26741-53-7]), and/or mixtures thereof and wherein the at least one light stabilizer and the at least one antioxidant are present in a ratio by weight of from 1:1 to 1:11.

In a further embodiment, the present invention relates to a plastics composition which comprises at least one platelet-shaped metal pigment, preferably an iron pigment coated with silicon oxides, silicon hydroxides and/or silicon oxide hydrates, in a quantity from a range of from 0.25 to 6.9 wt.-%, at least one light stabilizer as well as at least one antioxidant, wherein the plastics component consists of polypropylene (PP), PP copolymers, polyethylene (PE), PE copolymers, HDPE, LDPE, LLDPE or other polyolefins, wherein the at least one light stabilizer is selected from the group consisting of poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino)]] (CAS Reg. No. [71878-19-8]), 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS Reg. No. [192268-64-7]), butanedioic acid dimethyl ester, polymer with 4-hydroxy-2,2,6,6-tetramethyl-1-piperidineethanol (CAS Reg. No. [65447-77-0]), bis(2,2,6,6-tetramethylpiperid-4-yl) sebacate (CAS Reg. No. [52829-07-9]), Hostavin N30 (CAS Reg. No. [202483-55-4]), alpha-alkenes, C20-24, polymers with maleic anhydride, reaction products with 2,2,6,6-tetramethyl-4-piperidinamine (CAS Reg. No. [152261-33-1]), 2-(5-chloro-2H-benzotriazol-2-yl)-6-(1,1-dimethylethyl)-4-methylphenol (CAS Reg. No. [3896-11-5]), and/or mixtures thereof and wherein the at least one antioxidant is selected from the group consisting of pentaerythritol tetrakis(3-(3,5-di-tert-butyl-4-hydroxyphenyl)propionate) (CAS Reg. No. [6683-19-8]), octadecyl 3-(3,5-di-tert-butyl-4-hydroxyphenyl)propionate (CAS Reg. No. [2082-79-3]), tris(2,4-di-tert-butylphenyl)phosphite (CAS Reg. No. [31570-04-4]), tetrakis(2,4-di-tert-butylphenyl)[1,1-biphenyl]-4,4'-diylbisphosphonite (CAS Reg. No. [119345-01-6]), bis(2,4-di-tert-butylphenyl) pentaerythritol diphosphite, 3,9-bis(2,4-bis(1,1-dimethylethyl)phenoxy)-2,4,8,10-tetraoxa-3,9-diphosphaspiro(5.5)undecane (CAS Reg. No. [26741-53-7]), and/or mixtures thereof and wherein the at least one metal pigment and the at least one light stabilizer are present in a ratio by weight of from 1:11 to 11:1, preferably in a ratio by weight of from 5:1 to 1:5.

In a further embodiment, the present invention relates to a plastics composition which comprises at least one platelet-shaped metal pigment, preferably an iron pigment coated with silicon oxides, silicon hydroxides and/or silicon oxide hydrates, in a quantity from a range of from 0.1 to 4.6 wt.-%, at least one light stabilizer as well as at least one antioxidant, wherein the plastics component consists of polypropylene (PP), PP copolymers, polyethylene (PE), PE copolymers, HDPE, LDPE, LLDPE or other polyolefins, wherein the at least one light stabilizer is selected from the group consisting of poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (CAS Reg. No. [71878-19-8]), 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS Reg. No. [192268-64-7]), butanedioic acid dimethyl ester, polymer with 4-hydroxy-2,2,6,6-tetramethyl-1-piperidineethanol (CAS Reg. No. [65447-77-0]), bis(2,2,6,6-tetramethylpiperid-4-yl) sebacate (CAS Reg. No. [52829-07-9]), Hostavin N30 (CAS Reg. No. [202483-55-4]), alpha-alkenes, C20-24, polymers with maleic anhydride, reaction products with 2,2,6,6-tetramethyl-4-piperidinamine (CAS Reg. No. [152261-33-1]), 2-(5-chloro-2H-benzotriazol-2-yl)-6-(1,1-dimethylethyl)-4-methylphenol (CAS Reg. No. [3896-11-5]), and/or mixtures thereof and wherein the at least one antioxidant is selected from the group consisting of pentaerythritol tetrakis(3-(3,5-di-tert-butyl-4-hydroxyphenyl)propionate) (CAS Reg. No. [6683-19-8]), octadecyl 3-(3,5-di-tert-butyl-4-hydroxyphenyl)propionate (CAS Reg. No. [2082-79-3]), tris(2,4-di-tert-butylphenyl)phosphite (CAS Reg. No. [31570-04-4]), tetrakis(2,4-di-tert-butylphenyl)[1,1-biphenyl]-4,4'-diylbisphosphonite (CAS Reg. No. [119345-01-6]), bis(2,4-di-tert-butylphenyl) pentaerythritol diphosphite, 3,9-bis(2,4-bis(1,1-dimethylethyl)phenoxy)-2,4,8,10-tetraoxa-3,9-diphosphaspiro(5.5)undecane (CAS Reg. No. [26741-53-7]), and/or mixtures thereof and wherein the at least one light stabilizer and the at least one antioxidant are present in a ratio by weight of from 11:1 to 1:11.

In a further embodiment, the present invention relates to a plastics composition which comprises at least one platelet-shaped metal pigment, preferably an iron pigment coated with silicon oxides, silicon hydroxides and/or silicon oxide hydrates, in a quantity from a range of from 0.01 to 5.1 wt.-%, at least one light stabilizer as well as at least one antioxidant, wherein the plastics component consists of polystyrene (PS), SAN, HIPS, acrylonitrile-butadiene-styrene (ABS), ASA, other styrene copolymers, polycarbonate, polymer blends such as PC/ABS or PC/ASA, polyoxymethylene (POM), polyamides (PA6, PA6.6, PA11, PA12, etc.), polyesters such as PET, PBT, polyurethanes, thermoplastic polyurethanes (TPU), polymethyl methacrylate (PMMA) as well as other acrylate polymers, acrylate copolymers or other technical thermoplastics, wherein the at least one light stabilizer is selected from the group consisting of poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (CAS Reg. No. [71878-19-8]), bis(2,2,6,6-tetramethylpiperid-4-yl) sebacate (CAS Reg. No. [52829-07-9]), 1,3,5-triazine-2,4,6-triamine, N,N'''-1,2-ethanediylbis(N-(3-((4,6-bis(butyl(1,2,2,6,6-pentamethyl-4-piperidinyl)amino)-1,3,5-triazin-2-yl)amino)propyl)-N',N''-dibutyl-N',N''-bis(1,2,2,6,6-pentamethyl-4-piperidinyl)-1,3,5-triazine-2,4,6-triamine (CAS Reg. No. [106990-43-6]), bis(1,2,2,6,6-pentamethyl-4-piperidinyl)-[[3,5-bis(1,1-dimethylethyl)-4-hydroxyphenyl]methyl]butylmalonate (CAS Reg. No. [63843-89-0]), 2-(2H-benzotriazol-2-yl)-4,6-bis(1-methyl-1-phenylethyl)phenol, butanedioic acid dimethyl ester, polymer with 4-hydroxy-2,2,6,6-tetramethyl-1-piperidineethanol (CAS Reg. No. [65447-77-0]), (CAS Reg. No. [70321-86-7]), 2,4-di-tert-butyl-6-(5-chlorobenzotriazol-2-yl)phenol (CAS Reg. No. [3864-99-1]), 2-(2H-benzotriazol-2-yl)-6-dodecyl-4-methylphenol, branched and linear, (CAS Reg. No. [23328-53-2/125304-04-3/104487-30-1]), 2-(4,6-diphenyl-1,3,5-triazin-2-yl)-5-[(hexyl)oxy]-phenol (CAS Reg. No. [174315-50-2]), 3-(diaryl)[1,3,5]triazin-2-yl)-5-(alkoxy-substituted) phenol, N-(2-ethoxyphenyl)-N'-(2-ethylphenyl)ethanediamide (CAS Reg. No. [23949-66-8]), and/or mixtures thereof and wherein the at least one antioxidant is selected from the group consisting of pentaerythritol tetrakis(3-(3,5-di-tert-butyl-4-hydroxyphenyl)propionate) (CAS Reg. No. [6683-19-8]), octadecyl 3-(3,5-di-tert-butyl-4-hydroxyphenyl)propionate (CAS Reg. No. [2082-79-3]), 2-ethylpentyl 3-(3,5-di-tert-butyl-4-hydroxyphenyl)propanoate (CAS Reg. No. [125643-61-0]), ethylenebis(oxyethylene) bis(3-(5-tert-butyl-4-hydroxy-m-tolyl)propionate) (CAS Reg. No. [36443-68-2]), N,N'-hexane-1,6-diylbis(3-3,5-di-tert-butyl-4-hydroxyphenylpropionamide) (CAS Reg. No. [23128-74]), tris(2,4-di-tert-butylphenyl)phosphite (CAS Reg. No. [31570-04-4]) and/or mixtures thereof and wherein the at least one metal pigment and the at least one light stabilizer are present in a ratio by weight of from 1:11 to 11:1, preferably in a ratio by weight of from 3:1 to 1:3.

In a further embodiment, the present invention relates to a plastics composition which comprises at least one platelet-shaped metal pigment, preferably an iron pigment coated with silicon oxides, silicon hydroxides and/or silicon oxide hydrates, in a quantity from a range of from 0.1 to 4.3 wt.-%, at least one light stabilizer as well as at least one antioxidant, wherein the plastics component consists of polystyrene (PS), SAN, HIPS, acrylonitrile-butadiene-styrene (ABS), ASA, other styrene copolymers, polycarbonate, polymer blends such as PC/ABS or PC/ASA, polyoxymethylene (POM), polyamide (PA6, PA6.6, PA11, PA12, etc.), polyesters such as PET, PBT, polyurethanes, thermoplastic polyurethanes (TPU), polymethyl methacrylate (PMMA) as well as other acrylate polymers, acrylate copolymers or other technical thermoplastics, wherein the at least one light stabilizer is selected from the group consisting of poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]] (CAS Reg. No. [71878-19-8]), bis(2,2,6,6-tetramethylpiperid-4-yl) sebacate (CAS Reg. No. [52829-07-9]), 1,3,5-triazine-2,4,6-triamine, N,N'''-1,2-ethanediylbis(N-(3-(((4,6-bis(butyl(1,2,2,6,6-pentamethyl-4-piperidinyl)amino)-1,3,5-triazin-2-yl)amino)propyl)-N',N''-dibutyl-N',N''-bis(1,2,2,6,6-pentamethyl-4-piperidinyl)-1,3,5-triazine-2,4,6-triamine (CAS Reg. No. [106990-43-6]), bis(1,2,2,6,6-pentamethyl-4-piperidinyl)-[[3,5-bis(1,1-dimethylethyl)-4-hydroxyphenyl]methyl]butylmalonate (CAS Reg. No. [63843-89-0]), 2-(2H-benzotriazol-2-yl)-4,6-bis(1-methyl-1-phenylethyl)phenol, butanedioic acid dimethyl ester, polymer with 4-hydroxy-2,2,6,6-tetramethyl-1-piperidineethanol (CAS Reg. No. [65447-77-0]), (CAS Reg. No. [70321-86-7]), 2,4-di-tert-butyl-6-(5-chlorobenzotriazol-2-yl)phenol (CAS Reg. No. [3864-99-1]), 2-(2H-benzotriazol-2-yl)-6-dodecyl-4-methylphenol, branched and linear, (CAS Reg. No. [23328-53-2/125304-04-3/104487-30-1]), 2-(4,6-diphenyl-1,3,5-triazin-2-yl)-5-[(hexyl)oxy]-phenol (CAS Reg. No. [174315-50-2]), 3-(diaryl)[1,3,5]triazin-2-yl)-5-(alkoxy-substituted) phenol, N-(2-ethoxyphenyl)-N'-(2-ethylphenyl)ethanediamide (CAS Reg. No. [23949-66-8]), and/or mixtures thereof and wherein the at least one antioxidant is selected from the group consisting of pentaerythritol tetrakis(3-(3,5-di-tert-butyl-4-hydroxyphenyl)propionate) (CAS Reg. No. [6683-19-8]), octadecyl 3-(3,5-di-tert-butyl-4-hydroxyphenyl)propionate (CAS Reg. No. [2082-79-3]), 2-ethylpentyl 3-(3,5-di-tert-butyl-4-hydroxyphenyl)propanoate (CAS Reg. No. [125643-61-0]), ethylenebis(oxyethylene) bis(3-(5-tert-butyl-4-hydroxy-m-tolyl)propionate) (CAS Reg. No. [36443-68-2]), N,N'-hexane-1,6-diylbis(3-3,5-di-tert-butyl-4-hydroxyphenylpropionamide) (CAS Reg. No. [23128-74]), tris(2,4-di-tert-butylphenyl)phosphite (CAS Reg. No. [31570-04-4]), and/or mixtures thereof and wherein the at least one light stabilizer and the at least one antioxidant are present in a ratio by weight of from 11:1 to 1:11.

In a further embodiment, the present invention relates to a plastics composition which comprises at least one platelet-shaped metal pigment, preferably an iron pigment coated with silicon oxides, silicon hydroxides and/or silicon oxide hydrates, from a range of from 0.01 to 8.9 wt.-%, at least one light stabilizer as well as at least one antioxidant, wherein the plastics component consists of polyvinyl chloride (PVC) and other vinyl chloride-based polymers, wherein the at least one light stabilizer is selected from the group consisting of 2-(2H-benzotriazol-2-yl)-p-cresol (CAS Reg. No. [2440-22-4]), 2-(5-chloro-2H-benzotriazol-2-yl)-6-(1,1-dimethylethyl)-4-methylphenol (CAS Reg. No. [3896-11-5]), 2,4-di-tert-butyl-6-(5-chlorobenzotriazol-2-yl)phenol (CAS Reg. No. [3864-99-1]), 2-(2H-benzotriazol-2-yl)-4,6-ditert-pentylphenol (CAS Reg. No. [25973-55-1]), 2-(2H-benzotriazol-2-yl)-6-dodecyl-4-methylphenol, branched and linear (CAS Reg. No. [23328-53-2/125304-04-3/104487-30-1]), N-(2-ethoxyphenyl)-N'-(2-ethylphenyl)ethanediamide (CAS Reg. No. [23949-66-8]), 2-hydroxy-4-(n-octyloxy)benzophenone (CAS Reg. No. [1843-05-6]), and/or mixtures thereof and wherein the at least one antioxidant is selected from the group consisting of alkyl-tin stabilizers or organo-tin stabilizers and/or mixtures thereof and wherein the at least one light stabilizer and the at least one antioxidant are present in a ratio by weight of from 11:1 to 1:11.

In a further embodiment, the present invention relates to a plastics composition which comprises at least one platelet-shaped metal pigment, preferably an iron pigment coated with silicon oxides, silicon hydroxides and/or silicon oxide hydrates, from a range of from 0.01 to 7.2 wt.-%, at least one light stabilizer as well as at least one antioxidant, wherein the plastics component consists of polyvinyl chloride (PVC), and other vinyl chloride-based polymers, wherein the at least one light stabilizer is selected from the group consisting of 2-(2H-benzotriazol-2-yl)-p-cresol (CAS Reg. No. [2440-22-4]), 2-(5-chloro-2H-benzotriazol-2-yl)-6-(1,1-dimethylethyl)-4-methylphenol (CAS Reg. No. [3896-11-5]), 2,4-di-tert-butyl-6-(5-chlorobenzotriazol-2-yl)phenol (CAS Reg. No. [3864-99-1]), 2-(2H-benzotriazol-2-yl)-4,6-ditertpentylphenol (CAS Reg. No. [25973-55-1]), 2-(2H-benzotriazol-2-yl)-6-dodecyl-4-methylphenol, branched and linear (CAS Reg. No. [23328-53-2/125304-04-3/104487-30-1]), N-(2-ethoxyphenyl)-N'-(2-ethylphenyl)ethanediamide (CAS Reg. No. [23949-66-8]), 2-hydroxy-4-(n-octyloxy)benzophenone (CAS Reg. No. [1843-05-6]), and/or mixtures thereof and wherein the at least one antioxidant is selected from the group consisting of alkyl-tin stabilizers or organo-tin stabilizers, and/or mixtures thereof and wherein the at least one metal pigment and the at least one light stabilizer are present in a ratio by weight of from 1:11 to 11:1, preferably in a ratio by weight of from 6:1 to 1:6.

EXAMPLES

The following examples are intended to explain the invention in more detail, but without limiting it. All percentages are to be understood as wt.-%.

I Production of the Plastics Compositions According to the Invention as Well as the Plastics Compositions of the Comparison Examples Example The pigment of the examples and of the comparison examples was mixed with the respectively used plastics component according to Table 1 and extruded. The thus-obtained masterbatch was processed to form plates (surface area 100×70 mm; thickness 2 mm) using an injection-molding process.

To produce a 10 wt.-% masterbatch, the process was as follows:
Pigment in Powder Form:
870 g of the respective plastic in granular form, 100 g of the respective powdered pigment, 20 g of the respective light stabilizer and 10 g of the respective antioxidant were mixed in a tumbling mixer and then processed to form a granular material in a twin-screw extruder (from Labtech, Bangkok; diameter 20 mm, 28 L/D) at a processing temperature of approx. 230° C.

Pigment in Paste Form:

845 g of the respective plastic in granular form, 125 g of the respective pigment paste (with a pigment content of 80 wt.-%, relative to the total weight of the paste), 20 g of the respective light stabilizer and 10 g of the respective antioxidant were mixed in a tumbling mixer and then processed to form a granular material in a twin-screw extruder (from Labtech, Bangkok; diameter 20 mm, 28 L/D) at a processing temperature of approx. 230° C.

Pigment in Pellet Form:

845 g of the respective plastic in granular form, 125 g of the respective pigment preparation (pellet) (with a pigment content of 80 wt.-%, relative to the total weight of the pellet), 20 g of the respective light stabilizer and 10 g of the respective antioxidant were mixed in a tumbling mixer and then processed to form a granular material in a twin-screw extruder (from Labtech, Bangkok; diameter 20 mm, 28 L/D) at a processing temperature of approx. 230° C.

If a colorant is additionally added during the production of the masterbatch, the respective plastics component is reduced proportionately.

The thus-obtained masterbatch granular material was diluted to a content of 5.0 wt.-%, 2.5 wt.-%, 1 wt.-%, 0.5 wt.-%, 0.25 wt.-% and 0.1 wt.-% pigment, relative to the proportion by weight of the plate. This masterbatch granular material was then processed to form plates with the above-named dimensions by means of an injection-molding machine (Arburg 221 K-75-250) at the respective substance-specific processing temperature (e.g. PP 260° C.).

TABLE 1

| Example/Comparison example | Pigment | Plastics component/light stabilizer/antioxidant | Processing temperature |
|---|---|---|---|
| Example 1 | Platelet-shaped $SiO_2$-coated iron pigment; $D_{50}$ = 15-21 μm, 80 wt.-% paste in medicinal white oil | Polypropylene (R771-10; from DOW, Germany, Wesseling)/Hostavin N30 [202483-55-4] (from Clariant)/Hostanox O10 [6683-19-8] (from Clariant) | 260° C. |
| Example 2 | Platelet-shaped iron pigment, $D_{50}$ = 12 μm, 80 wt.-% paste in medicinal white oil | Polypropylene (R771-10; from DOW, Germany, Wesseling)/Hostavin N30 [202483-55-4] (from Clariant)/Hostanox O10 [6683-19-8] (from Clariant) | 260° C. |
| Example 3 | Platelet-shaped $SiO_2$-coated aluminum pigment; $D_{50}$ = 18 μm, powder | Polypropylene (R771-10; from DOW, Germany, Wesseling)/Hostavin N30 [202483-55-4] (from Clariant)/Hostanox O10 [6683-19-8] (from Clariant) | 260° C. |
| Example 4 | Platelet-shaped aluminum pigment; $D_{50}$ = 13 μm, powder | Polypropylene (R771-10; from DOW, Germany, Wesseling)/Hostavin N30 [202483-55-4] (from Clariant)/Hostanox O10 [6683-19-8] (from Clariant) | 260° C. |
| Example 5 | Platelet-shaped $SiO_2$-coated aluminum pigment with hematite embedded in $SiO_2$ matrix; $D_{50}$ = 49 μm, powder | Polypropylene (R771-10; from DOW, Germany, Wesseling)/Hostavin N30 [202483-55-4] (from Clariant)/Hostanox O10 [6683-19-8] (from Clariant) | 260° C. |
| Example 6 | Platelet-shaped $SiO_2$-coated aluminum pigment with $TiO_2$ embedded in $SiO_2$ matrix; $D_{50}$ = 49 μm, powder | Polypropylene (R771-10; from DOW, Germany, Wesseling)/Hostavin N30 [202483-55-4] (from Clariant)/Hostanox O10 [6683-19-8] (from Clariant) | 260° C. |
| Example 7 | Platelet-shaped $SiO_2$-coated aluminum pigment with ZnS embedded in $SiO_2$ matrix; $D_{50}$ = 49 μm, powder | Polypropylene (R771-10; from DOW, Germany, Wesseling)/Hostavin N30 [202483-55-4] (from Clariant)/Hostanox O10 [6683-19-8] (from Clariant) | 260° C. |
| Example 8 | Platelet-shaped $SiO_2$-coated aluminum pigment with $TiO_2$ and ZnS embedded in $SiO_2$ matrix; $D_{50}$ = 49 μm, powder | Polypropylene (R771-10; from DOW, Germany, Wesseling)/Hostavin N30 [202483-55-4] (from Clariant)/Hostanox O10 [6683-19-8] (from Clariant) | 260° C. |
| Example 9 | Platelet-shaped stainless steel pigment, $D_{50}$ = 30-40 μm, 80 wt.-% paste in medicinal white oil | Polypropylene (R771-10; from DOW, Germany, Wesseling)/Hostavin N30 [202483-55-4] (from Clariant)/Hostanox O10 [6683-19-8] (from Clariant) | 260° C. |

TABLE 1-continued

| Example/ Comparison example | Pigment | Plastics component/light stabilizer/antioxidant | Processing temperature |
|---|---|---|---|
| Example 10 | Platelet-shaped SiO$_2$-coated iron pigment; D$_{50}$ = 15-21 µm, powder | Polyethylene (LDPE 410E; from Dow)/Hostavin N30 [202483-55-4] (from Clariant)/ Hostanox O16 [2082-79-3] (from Clariant) | 230° C. |
| Example 11 | Platelet-shaped iron pigment, D$_{50}$ = 12 µm, paste | Polyethylene (LDPE 410E; from Dow)/Hostavin N30 [202483-55-4] (from Clariant)/ Hostanox O16 [2082-79-3] (from Clariant) | 230° C. |
| Example 12 | Platelet-shaped SiO$_2$-coated aluminum pigment; D$_{50}$ = 18 µm, powder | Polyethylene (LDPE 410E; from Dow)/Hostavin N30 [202483-55-4] (from Clariant)/ Hostanox O16 [2082-79-3] (from Clariant) | 230° C. |
| Example 13 | Platelet-shaped SiO$_2$-coated aluminum pigment with hematite embedded in SiO$_2$ matrix; D$_{50}$ = 49 µm, powder | Polyethylene (LDPE 410E; from Dow)/Hostavin N30 [202483-55-4] (from Clariant)/ Hostanox O16 [2082-79-3] (from Clariant) | 230° C. |
| Example 14 | Platelet-shaped SiO$_2$-coated aluminum pigment with TiO$_2$ embedded in SiO$_2$ matrix; D$_{50}$ = 49 µm, powder | Polyethylene (LDPE 410E; from Dow)/Hostavin N30 [202483-55-4] (from Clariant)/ Hostanox O16 [2082-79-3] (from Clariant) | 230° C. |
| Example 15 | Platelet-shaped SiO$_2$-coated aluminum pigment with ZnS embedded in SiO$_2$ matrix; D$_{50}$ = 49 µm | Polyethylene (LDPE 410E; from Dow)/Hostavin N30 [202483-55-4] (from Clariant)/ Hostanox O16 [2082-79-3] (from Clariant) | 230° C. |
| Example 16 | Platelet-shaped SiO$_2$-coated aluminum pigment with TiO$_2$ and ZnS embedded in SiO$_2$ matrix; D$_{50}$ = 49 µm | Polyethylene (LDPE 410E; from Dow)/Hostavin N30 [202483-55-4] (from Clariant)/ Hostanox O16 [2082-79-3] (from Clariant) | 230° C. |
| Example 17 | Platelet-shaped SiO$_2$-coated iron pigment with hematite embedded in SiO$_2$ matrix; D$_{50}$ = 49 µm | Polyethylene (LDPE 410E; from Dow)/Hostavin N30 [202483-55-4] (from Clariant)/ Hostanox O16 [2082-79-3] (from Clariant) | 230° C. |
| Example 18 | Platelet-shaped SiO$_2$-coated iron pigment; D$_{50}$ = 15-21 µm | Polyvinyl chloride (SOLVIN 264PC; from Solvin SA, Brussels)/Hostavin VSU [23949-66-8]/Hostanox 245 [36443-68-2], both from Clariant | 160° C. |
| Example 19 | Platelet-shaped iron pigment, D$_{50}$ = 12 µm, 80 wt.-% paste in medicinal white oil | Polyvinyl chloride (SOLVIN 264PC; from Solvin SA, Brussels)/Hostavin VSU [23949-66-8]/Hostanox 245 [36443-68-2], both from Clariant | 160° C. |
| Example 20 | Platelet-shaped SiO$_2$-coated aluminum pigment; D$_{50}$ = 18 µm, powder | Polyvinyl chloride (SOLVIN 264PC; from Solvin SA, Brussels)/Hostavin VSU [23949-66-8]/Hostanox 245 [36443-68-2], both from Clariant | 160° C. |
| Example 21 | Platelet-shaped SiO$_2$-coated aluminum pigment with hematite embedded in SiO$_2$ matrix; D$_{50}$ = 49 µm | Polyvinyl chloride (SOLVIN 264PC; from Solvin SA, Brussels)/Hostavin VSU [23949-66-8]/Hostanox 245 [36443-68-2], both from Clariant | 160° C. |
| Example 22 | Platelet-shaped SiO$_2$-coated aluminum pigment with TiO$_2$ embedded in SiO$_2$ matrix; D$_{50}$ = 49 µm | Polyvinyl chloride (SOLVIN 264PC; from Solvin SA, Brussels)/Hostavin VSU [23949-66-8]/Hostanox 245 [36443-68-2], both from Clariant | 160° C. |

TABLE 1-continued

| Example/ Comparison example | Pigment | Plastics component/light stabilizer/antioxidant | Processing temperature |
|---|---|---|---|
| Example 23 | Platelet-shaped $SiO_2$-coated iron pigment; $D_{50}$ = 15-21 μm | Polycarbonate (CALIBRE 201, from Dow)/Tinuvin 1577 [174315-50-2] from BASF SE/ Irgafos 168 [31570-04-4] from BASF SE | 290° C. |
| Example 24 | Platelet-shaped iron pigment, $D_{50}$ = 12 μm | Polycarbonate (CALIBRE 201, from Dow)/Tinuvin 1577 [174315-50-2] from BASF SE/ Irgafos 168 [31570-04-4] from BASF SE | 290° C. |
| Example 25 | Platelet-shaped $SiO_2$-coated aluminum pigment; $D_{50}$ = 18 μm | Polycarbonate (CALIBRE 201, from Dow)/Tinuvin 1577 [174315-50-2] from BASF SE/ Irgafos 168 [31570-04-4] from BASF SE | 290° C. |
| Example 26 | Platelet-shaped $SiO_2$-coated iron pigment; $D_{50}$ = 15-21 μm | Polystyrene (Styron 678, from Styron, Netherlands)/ Hostavin N845 [86403-32-9]/ Hostanox 245 [36443-68-2], both from Clariant | 250° C. |
| Example 27 | Platelet-shaped iron pigment, $D_{50}$ = 12 μm | Polystyrene (Styron 678, from Styron, Netherlands)/ Hostavin N845 [86403-32-9]/ Hostanox 245 [36443-68-2], both from Clariant | 250° C. |
| Example 28 | Platelet-shaped $SiO_2$-coated aluminum pigment; $D_{50}$ = 18 μm | Polystyrene (Styron 678, from Styron, Netherlands)/ Hostavin N845 [86403-32-9]/ Hostanox 245 [36443-68-2], both from Clariant | 250° C. |
| Example 29 | Platelet-shaped stainless steel pigment, 80 wt.-% paste in medicinal white oil | Polystyrene (Styron 678, from Styron, Netherlands)/ Hostavin N845 [86403-32-9]/ Hostanox 245 [36443-68-2], both from Clariant | 250° C. |
| Example 30 | Platelet-shaped $SiO_2$-coated iron pigment with hematite embedded in $SiO_2$ matrix; $D_{50}$ = 49 μm | Polystyrene (Styron 678, from Styron, Netherlands)/ Hostavin N845 [86403-32-9]/ Hostanox 245 [36443-68-2], both from Clariant | 250° C. |
| Example 31 | Platelet-shaped $SiO_2$-coated iron pigment; $D_{50}$ = 15-21 μm and 0.2 wt.-% PV-Fast Yellow H9G (from Clariant) | Polypropylene (R771-10; from DOW, Germany, Wesseling)/ Hostavin N30 [202483-55-4] (from Clariant)/Hostanox O10 [6683-19-8] (from Clariant) | 260° C. |
| Example 32 | Platelet-shaped $SiO_2$-coated iron pigment; $D_{50}$ = 15-21 μm and 0.2 wt.-% PV-Fast Yellow H3R (from Clariant) | Polypropylene (R771-10; from DOW, Germany, Wesseling)/ Hostavin N30 [202483-55-4] (from Clariant)/Hostanox O10 [6683-19-8] (from Clariant) | 260° C. |
| Example 33 | Platelet-shaped $SiO_2$-coated iron pigment; $D_{50}$ = 15-21 μm and 0.2 wt.-% PV-Fast Red D3G (from Clariant) | Polypropylene (R771-10; from DOW, Germany, Wesseling)/ Hostavin N30 [202483-55-4] (from Clariant)/Hostanox O10 [6683-19-8] (from Clariant) | 260° C. |
| Example 34 | Platelet-shaped $SiO_2$-coated iron pigment; $D_{50}$ = 15-21 μm and 0.2 wt.-% PV-Fast Violet RL (from Clariant) | Polypropylene (R771-10; from DOW, Germany, Wesseling)/ Hostavin N30 [202483-55-4] (from Clariant)/Hostanox O10 [6683-19-8] (from Clariant) | 260° C. |
| Example 35 | Platelet-shaped $SiO_2$-coated iron pigment; $D_{50}$ = 15-21 μm and 0.2 wt.-% PV-Fast Blue A4R (from Clariant) | Polypropylene (R771-10; from DOW, Germany, Wesseling)/ Hostavin N30 [202483-55-4] (from Clariant)/Hostanox O10 [6683-19-8] (from Clariant) | 260° C. |

TABLE 1-continued

| Example/Comparison example | Pigment | Plastics component/light stabilizer/antioxidant | Processing temperature |
|---|---|---|---|
| Example 36 | Platelet-shaped $SiO_2$-coated iron pigment; $D_{50}$ = 15-21 µm and 0.2 wt.-% PV-Fast Green GG01 (from Clariant) | Polypropylene (R771-10; from DOW, Germany, Wesseling)/Hostavin N30 [202483-55-4] (from Clariant)/Hostanox O10 [6683-19-8] (from Clariant) | 260° C. |
| Example 37 | Platelet-shaped $SiO_2$-coated iron pigment; $D_{50}$ = 15-21 µm and 0.1 wt.-% Printex P (from Orion) | Polypropylene (R771-10; from DOW, Germany, Wesseling)/Hostavin N30 [202483-55-4] (from Clariant)/Hostanox O10 [6683-19-8] (from Clariant) | 260° C. |
| Example 38 | Platelet-shaped aluminum pigment with polyolefin-based binder in pellet form, $D_{50}$ = 15-17 µm | Polypropylene (R771-10; from DOW, Germany, Wesseling)/Hostavin N30 [202483-55-4] (from Clariant)/Hostanox O10 [6683-19-8] (from Clariant) | 260° C. |
| Example 39 | Platelet-shaped iron pigment with polyolefin-based binder in pellet form, $D_{50}$ = 12 µm | Polypropylene (R771-10; from DOW, Germany, Wesseling)/Hostavin N30 [202483-55-4] (from Clariant)/Hostanox O10 [6683-19-8] (from Clariant) | 260° C. |
| Example 40 | Platelet-shaped $SiO_2$-coated aluminum pigment with copper chromite embedded in $SiO_2$ matrix; $D_{50}$ = 49 µm, powder | Polypropylene (R771-10; from DOW, Germany, Wesseling)/Hostavin N30 [202483-55-4] (from Clariant)/Hostanox O10 [6683-19-8] (from Clariant) | 260° C. |
| Comparison example 1 | Printex P (from Orion Engineered Carbons) | Polypropylene (R771-10; from DOW, Germany, Wesseling)/Hostavin N30 [202483-55-4] (from Clariant)/Hostanox O10 [6683-19-8] (from Clariant) | 260° C. |
| Comparison example 2 | Sicopal Black L 0095 (from BASF SE) | Polypropylene (R771-10; from DOW, Germany, Wesseling)/Hostavin N30 [202483-55-4] (from Clariant)/Hostanox O10 [6683-19-8] (from Clariant) | 260° C. |
| Comparison example 3 | Shepherd Black 430 (from Shepherd) | Polypropylene (R771-10; from DOW, Germany, Wesseling)/Hostavin N30 [202483-55-4] (from Clariant)/Hostanox O10 [6683-19-8] (from Clariant) | 260° C. |
| Comparison example 4 | Iriodin 600 (from Merck) | Polypropylene (R771-10; from DOW, Germany, Wesseling)/Hostavin N30 [202483-55-4] (from Clariant)/Hostanox O10 [6683-19-8] (from Clariant) | 260° C. |
| Comparison example 5 | Printex P (from Orion Engineered Carbons) and Kronos 2222 (from Kronos) | Polypropylene (R771-10; from DOW, Germany, Wesseling)/Hostavin N30 [202483-55-4] (from Clariant)/Hostanox O10 [6683-19-8] (from Clariant) | 260° C. |

The metal pigments used in Table 1 can be produced according to EP 1 251 152 A1, EP 1 251 153 A1, EP 2 157 138 A1 or WO 2008/155038 A2. The platelet-shaped aluminum or stainless steel pigments used in Table 1 can be selected from the pigments, suitable for plastics, of the product groups STAPA, STANDART or STAY STEEL, in each case from ECKART GmbH.

$SiO_2$-coated means that the metal pigments can be covered with a layer of silicon oxides, silicon hydroxides and silicon oxide hydrates.

Example 41

Transformation of the Plastics Composition According to the Invention into a Compacted Form (Pellet)

700 g of the plastics composition from Example 1 is homogeneously mixed with 300 g polyolefin wax Licocene PP 6102 from Clariant in a tumbling mixer.

This mixture is extruded in a twin-screw extruder (from Labtech, Bangkok; diameter 20 mm, 28 L/D) at a temperature of 140° C. The extrudate is a 70% pellet and can be used directly for plastics dyeing (extrusion, injection molding) after cooling.

II Characterization of the Plastics Compositions of the Examples and Comparison Examples IIa Measurement of the Diffuse Reflection in the Range of from 280 to 2500 nm The plates of the examples and of the comparison examples were measured in the wavelength range of from 250 nm to 2500 nm by means of a UV-Vis-NIR spectrometer (Perkin Elmer, Lambda 1050). A PP plate without added pigment was used as reference. The evaluation was effected according to ASTM G173-03.

TABLE 2

| Example/Comparison example | Concentration (wt.-%) | Total solar reflectance (%) | Opacity |
| --- | --- | --- | --- |
| Example 1 | 0.1 | 23 | Not opaque |
|  | 0.25 | 25 | Opaque |
|  | 0.5 | 26 | Opaque |
|  | 1.0 | 28 | Opaque |
|  | 2.5 | 30 | Opaque |
|  | 5.0 | 33 | Opaque |
|  | 10.0 | 35 | Opaque |
| Example 3 | 0.1 | 43 | Not opaque |
|  | 0.25 | 47 | Opaque |
|  | 0.5 | 50 | Opaque |
|  | 1.0 | 53 | Opaque |
|  | 2.5 | 58 | Opaque |
|  | 5.0 | 61 | Opaque |
|  | 10.0 | 63 | Opaque |
| Example 40 | 0.1 | 11 | Not opaque |
|  | 0.25 | 12 | Opaque |
|  | 0.5 | 13 | Opaque |
|  | 1.0 | 14 | Opaque |
|  | 2.5 | 15 | Opaque |
|  | 5.0 | 15 | Opaque |
|  | 10.0 | 16 | Opaque |
| Comparison example 1 | 0.01 | 4.8 | Not opaque |
|  | 0.02 | 4.4 | Not opaque |
|  | 0.03 | 4.4 | Opaque |
|  | 0.04 | 4.4 | Opaque |
|  | 0.05 | 4.4 | Opaque |
|  | 0.075 | 4.5 | Opaque |
|  | 0.10 | 4.5 | Opaque |
| Comparison example 2 | 0.1 | 16 | Not opaque |
|  | 0.25 | 16 | Not opaque |
|  | 0.5 | 16 | Opaque |
|  | 1.0 | 16 | Opaque |
|  | 2.5 | 17 | Opaque |
|  | 5.0 | 17 | Opaque |
|  | 10.0 | 18 | Opaque |
| Comparison example 3 | 0.1 | 8 | Not opaque |
|  | 0.25 | 7 | Opaque |
|  | 0.5 | 6 | Opaque |
|  | 1.0 | 6 | Opaque |
|  | 2.5 | 6 | Opaque |
|  | 5.0 | 6 | Opaque |
|  | 10.0 | 7 | Opaque |
| Comparison example 4 | 0.1 | 7 | Not opaque |
|  | 0.25 | 6 | Not opaque |
|  | 0.5 | 6 | Opaque |
|  | 1.0 | 6 | Opaque |
|  | 2.5 | 6 | Opaque |
|  | 5.0 | 6 | Opaque |
|  | 10.0 | 6 | Opaque |

The plastics compositions according to the invention from Examples 1, 3 and 40 are characterized, unlike the plastics compositions from the comparison examples, by their extremely high total solar reflectance (TSR), even at a low concentration of metal pigment used. At the same time, the plastics composition according to the invention also displays an extremely high opacity at a low concentration of metal pigment used. This special characteristic makes it possible in particular to produce thin, solar reflective and at the same time opaque applications, such as e.g. films with a thickness of from 10 to 100 μm, among other things for agrofoils, greenhouse films or thermal protection films. In applications with a thickness of >0.5 mm an extremely good TSR can also be achieved with very small added quantities. This effect is useful both in the outdoor sector and for automobile applications such as vehicle fittings and other plastic parts in the field of vehicle interiors which are exposed to sunlight to a large extent.

IIb Opacity

The opacity of dyed plastic plates from the examples and comparison examples (thickness in every case: 2 mm) was assessed visually. Here, the plastic plates were placed on the black-white opacity chart (Byko-Chart 2853, from Byk Gardner) such that one half of the plastic plate comes to lie on the black background and the other half comes to lie on the white background.

If it is no longer possible to distinguish between the black and the white parts of the chart through the plastic plate, the plastic plate was classified as opaque. The results are shown in Table 2.

IIc Particle Size Measurement

The size-distribution curve of the metal effect pigments and pigments of the comparison examples was measured using a device from Quantachrome (device: Cilas 1064) in accordance with the manufacturer's instructions. For this, approx. 1.5 g of the pigment was suspended in isopropanol, treated for 300 seconds in an ultrasonic bath (device: Sonorex IK 52, from Bandelin) and then placed in the sample preparation cell of the measurement device by means of a Pasteur pipette and measured several times. The resulting averages were calculated from the individual measurement results. The evaluation of the scattered light signals was effected according to the Fraunhofer method.

By the average size $D_{50}$ is meant within the framework of this invention the $D_{50}$ value of the cumulative frequency distribution of the volume-averaged size-distribution function, as obtained by laser diffraction methods. The $D_{50}$ value indicates that 50% of the metal pigments have a diameter which is equal to or smaller than the indicated value, for example 20 μm. Correspondingly, the $D_{90}$ value indicates that 90% of the pigments have a diameter which is equal to or smaller than the respective value. Furthermore, the $D_{10}$ value indicates that 10% of the pigments have a diameter which is equal to or smaller than the respective value.

IId Heating Rate of the Plastics Composition According to the Invention

The heating rate of the plastics composition was determined analogously to ASTM D 4803-97 (Reapproved 2002).

TABLE 3

| Example/Comparison example | Concentration of pigment | Time [s] | Temperature [° C.] |
| --- | --- | --- | --- |
| Example 1 | 1.0 wt.-% | 10 | 25 |
|  |  | 300 | 42 |
|  |  | 900 | 62 |
|  |  | 1500 | 71 |
|  |  | 2000 | 75 |
|  |  | 3000 | 78 |
|  |  | 3500 | 79 |
|  |  | 3998 | 80 |

TABLE 3-continued

| Example/Comparison example | Concentration of pigment | Time [s] | Temperature [° C.] |
|---|---|---|---|
| Comparison example 4 | 1.0 wt.-% | 10 | 25 |
|  |  | 300 | 48 |
|  |  | 900 | 79 |
|  |  | 1500 | 90 |
|  |  | 2000 | 93 |
|  |  | 3000 | 96 |
|  |  | 3500 | 97 |
|  |  | 3998 | 98 |
| Comparison example 5 | 0.5 wt.-% Printex P/0.25 wt.-% Kronos 2222 | 10 | 25 |
|  |  | 300 | 48 |
|  |  | 900 | 76 |
|  |  | 1500 | 86 |
|  |  | 2000 | 90 |
|  |  | 3000 | 94 |
|  |  | 3500 | 95 |
|  |  | 3998 | 95 |

The plastics composition according to the invention according to Example 1 heats up much less strongly than the plastics compositions from Comparison examples 4 and 5. This is interesting in particular with regard to the fact that the plastics compositions from Example 1, Comparison example 4 and Comparison example 5 are perceived as dark by the human eye.

The invention claimed is:
1. A plastics composition
comprising at least one platelet-shaped metal pigment in a quantity from a range of from 0.01 to 25 wt.-%, wherein the at least one metal pigment comprises an iron content of at least about 50 weight percent based upon total weight of the metal pigment,
at least one light stabilizer in a quantity of from 0.01 to 10 wt.-%, and
at least one antioxidant in a quantity of from 0.01 to 2 wt.-%,
wherein the at least one light stabilizer and the at least one antioxidant are in quantities relative to the total weight of the plastics composition.
2. The plastics composition according to claim 1, wherein the at least one metal pigment comprises an iron content of at least about 95 weight percent based upon total weight of the metal pigment.
3. The plastics composition according to claim 1, wherein the platelet-shaped metal pigment is coated with a silicon oxide, silicon hydroxide and/or silicon oxide hydrate layer.
4. The plastics composition according to claim 1, wherein the platelet-shaped metal pigment is an iron pigment which is coated with a silicon oxide, silicon hydroxide and/or silicon oxide hydrate layer, and further wherein the iron core of the iron pigment has an average thickness in a range of from 20 nm to less than 100 nm.
5. The plastics composition according to claim 1, wherein the average particle size $D_{50}$ of the metal pigment lies in a range of from 1 μm to 100 μm.
6. The plastics composition according to claim 1, wherein a plastics component of the plastics composition further comprises at least one of polypropylene (PP), PP copolymers, polyethylene (PE), PE copolymers, high density polyethylene (HDPE), Low Density Polyethylene (LDPE), Linear Low Density Polyethylene (LLDPE), polystyrene (PS), styrene/acrylonitrile (SAN), high impact polystyrene (HIPS), acrylonitrile-butadiene-styrene (ABS), acrylonitrile-styrene-acrylate (ASA), polycarbonate (PC), polymer blends of PC/ABS, polymer blends of PC/ASA, polyoxymethylene (POM), polyamide, polyester, polyurethane, polymethyl methacrylate (PMMA), or mixtures thereof.
7. The plastics composition according to claim 1, wherein the light stabilizer is a sterically hindered amine (HALS) and/or a UV absorber.
8. The plastics composition according to claim 1, wherein the plastics composition is present in granulated form.
9. The plastics composition according to claim 1, wherein the plastics composition is in the form of a film, plate or profile.
10. The plastics composition according to claim 1, comprising at least one platelet-shaped iron pigment coated with silicon oxide(s), silicon hydroxide(s) and/or silicon oxide hydrate(s).
11. The plastics composition according to claim 1, wherein the at least one platelet-shaped metal pigment further comprises at least one aluminum pigment, aluminum alloy pigment or mixtures thereof.
12. The plastics composition according to claim 1, wherein the at least one platelet-shaped metal pigment is surface modified with one or more silanes.
13. The plastics composition according to claim 1, wherein the plastics component further comprises one or more of polyolefins, polystyrenes, polyesters, polyether, polyamides, poly(meth)acrylates, thermoplastic polyurethanes, polysulfones, polyacetals, polyvinyl chloride, mixtures thereof or copolymers thereof.
14. The plastics composition according to claim 1, wherein the plastics component further comprises polyvinyl chloride (PVC) and other vinyl chloride-based polymers.
15. The plastics composition according to claim 1, wherein the at least one light stabilizer is selected from the group consisting of 2-(2'-hydroxyphenyl)-benzotriazoles, 2-hydroxybenzophenones, acrylates, oxalic acid diamides, 2-(2-Hydroxyphenyl)-1,3,5-triazines, formamidines, sterically hindered amines, nickel light stabilizers, and mixtures thereof.
16. The plastics composition according to claim 1, wherein the at least one light stabilizer is selected from the group consisting of 2-(2H-benzotriazol-2-yl)-p-cresol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2,4-di-tert-butyl-6-(5-chlorobenzotriazol-2-yl)phenol, 2-(2H-benzotriazol-2-yl)-4,6-ditertpentylphenol, 2,2'-methylenebis-(6-(2H-benzotriazol-2-yl)-4,1,3,3-tetramethylbutyl)phenol, N-(2-ethoxyphenyl)-N'-(2-ethylphenyl)ethanediamide, 2-(2H-benzotriazol-2-yl)-6-dodecyl-4-methylphenol, branched and linear, 2-(4,6-diphenyl-1,3,5-triazin-2-yl)-5-[(hexyl)oxy]-phenol, 3-(diaryl)[1,3,5]triazin-2-yl)-5-(alkoxy-substituted) phenol, 2,4-bis(2,4-dimethylphenyl)-6-(2-hydroxy-4-iso-octyloxyphenyl)-s-triazine, 4-[[[methylphenylamino]methylene] amino]benzoic acid ethyl ester, bis(2,2,6,6-tetramethylpiperid-4-yl) sebacate, bis(1,2,2,6,6-pentamethyl-4-piperidyl) sebacate, methyl 1,2,2,6,6-pentamethyl-4-piperidyl) sebacate, decanedioic acid, bis(2,2,6,6-tetramethyl-1-(octyloxy)-4-piperidinyl) ester, reaction products with 1,1-dimethylethyl hydroperoxide and octane, poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], N,N'-bis(2,2,6,6-tetramethyl-4-piperidinyl)-1,6-hexanediamine, polymer with 2,4,6-trichloro-1,3,5-triazine, reaction product with N-butyl-1-butanamine and N-butyl-2,2,6,6-tetramethyl-4-piperidinamine, N,N'''-[1,2-ethane-diyl-bis [[[4,6-bis-[butyl (1,2,2,6,6-pentamethyl-4-piperidinyl)amino]-1,3,5-triazin-2-yl]imino]-3,1-propanediyl]]bis[N',N''-dibutyl-N',N''-bis

(1,2,2,6,6-pentamethyl-4-piperidinyl)-1,3,5-triazine-2,4,6-triamine, butanedioic acid dimethyl ester, polymer with 4-hydroxy-2,2,6,6-tetramethyl-1-piperidineethanol, bis(1,2,2,6,6-pentamethyl-4-piperidinyl)-[[3,5-bis(1,1-dimethylethyl)-4-hydroxyphenyl]methyl]butylmalonate and mixtures thereof.

17. The plastics composition according to claim 1, wherein the antioxidant is selected from the group consisting of: alkylated monophenols, alkylthiomethylphenols, hydroquinones, alkylated hydroquinones, tocopherols, hydroxylated thiodiphenyl ethers, alkylidene bisphenols, O-, N- and S-benzyl compounds, hydroxybenzylated malonates, aromatic hydroxybenzyl compounds, triazine compounds, benzylphosphonates, acylaminophenols, esters of β-(3,5-di-tert-butyl-4-hydroxyphenyl)propionic acid with mono- or polyalcohols, esters of β-(5-tert-butyl-4-hydroxy-3-methylphenyl)propionic acid with mono-polyalcohols, esters of β-(3,5-dicyclohexyl-4-hydroxyphenyl)propionic acid with mono- or polyalcohols, esters of 3,5-di-tert-butyl-4-hydroxyphenylacetic acid with mono- or polyalcohols, amides of β-(3,5-di-tert-butyl-4-hydroxyphenyl)propionic acid, ascorbic acid, aminic antioxidants, and mixtures thereof.

18. The plastics composition according to claim 1, wherein the antioxidant is selected from the group consisting of: pentaerythritol tetrakis(3-(3,5-di-tert-butyl-4-hydroxyphenyl)propionate), octadecyl 3-(3,5-di-tert-butyl-4-hydroxyphenyl)propionate, tris(2,4-di-tert-butylphenyl)phosphite, tetrakis(2,4-di-tert-butylphenyl)[1,1-biphenyl]-4,4'-diylbisphosphonite, bis(2,4-di-tert-butylphenyl) pentaerythritol diphosphite, 3,9-bis(2,4-bis(1,1-dimethylethyl)phenoxy)-2,4,8,10-tetraoxa-3,9-diphosphaspiro(5.5) undecane and mixtures thereof.

19. The plastics composition according to claim 1, wherein the at least one antioxidant is selected from the group consisting of: alkyl-tin stabilizers, organo-tin stabilizers and mixtures thereof.

20. The plastics composition according to claim 1, further comprising at least one color pigment particle having a low absorption in the near-infrared (NIR) wavelength range of from 0.8 to 2.5 nm.

21. The plastics composition according to claim 1, wherein the at least one metal pigment is an iron alloy pigment comprising an iron content of at least about 50 weight percent to about 95 weight percent based upon total weight of the metal pigment.

22. A method for producing the plastics composition according to claim 1,
wherein the method comprises:
a) mixing the at least one metal pigment, the at least one light stabilizer and the at least one antioxidant with a plastics component,
b) extruding the mixture from step a), and
c) injection-molding the extrudate from step b) to form plates.

* * * * *

UNITED STATES PATENT AND TRADEMARK OFFICE
CERTIFICATE OF CORRECTION

Page 1 of 1

PATENT NO. : 10,208,201 B2
APPLICATION NO. : 15/029057
DATED : February 19, 2019
INVENTOR(S) : Dietmar Mader et al.

It is certified that error appears in the above-identified patent and that said Letters Patent is hereby corrected as shown below:

In the Claims

Column 44, Line 24, Claim 13, delete "polyether," and insert -- polyethers, --

Column 44, Line 65, Claim 16, delete "-bis [[[4,6-" and insert -- bis[[[4,6- --

Signed and Sealed this
Seventh Day of May, 2019

Andrei Iancu
*Director of the United States Patent and Trademark Office*